(12) United States Patent
Besore et al.

(10) Patent No.: US 8,474,279 B2
(45) Date of Patent: Jul. 2, 2013

(54) ENERGY MANAGEMENT OF HOUSEHOLD APPLIANCES

(75) Inventors: John K. Besore, Prospect, KY (US); Richard DeVos, Goshen, KY (US); Jeff Donald Drake, Louisville, KY (US); Michael F. Finch, Louisville, KY (US); Ronald Gary Foster, Louisville, KY (US); Darin Franks, Lanesville, IN (US); William Newton, Brooks, KY (US); Steven Keith Root, Buckner, KY (US); Natarajan Venkatakrishnan, Louisville, KY (US); Eric K. Watson, Crestwood, KY (US); Timothy Dale Worthington, Crestwood, KY (US)

(73) Assignee: General Electric Company, Schenectady, NY (US)

( * ) Notice: Subject to any disclaimer, the term of this patent is extended or adjusted under 35 U.S.C. 154(b) by 819 days.

(21) Appl. No.: 12/559,561

(22) Filed: Sep. 15, 2009

(65) Prior Publication Data

US 2010/0101254 A1 Apr. 29, 2010

Related U.S. Application Data

(60) Provisional application No. 61/097,082, filed on Sep. 15, 2008.

(51) Int. Cl.
*G05D 23/19* (2006.01)
*F25B 49/00* (2006.01)

(52) U.S. Cl.
USPC .......... 62/157; 62/228.1; 62/230; 340/870.17

(58) Field of Classification Search
USPC ................ 62/151, 157, 158, 228.1, 230, 231, 62/233; 700/276; 340/870.17
See application file for complete search history.

(56) References Cited

U.S. PATENT DOCUMENTS 2,545,054 A 3/1951 Stitz
3,683,343 A 8/1972 Feldman et al.
(Continued)

FOREIGN PATENT DOCUMENTS

CN 1692317 A 11/2005
CN 101013979 A 8/2007
(Continued)

OTHER PUBLICATIONS

PCT Application No. PCT/US09/56911, Search Report, Mar. 10, 2010.

(Continued)

*Primary Examiner* — Marc Norman
(74) *Attorney, Agent, or Firm* — Global Patent Operation

(57) ABSTRACT

A refrigerator comprises a fresh food compartment and a freezer compartment and one or more power consuming features/functions including a refrigeration system for cooling the fresh food compartment and the freezer compartment. A controller is operatively connected to the one or more power consuming features/functions. The controller is configured to receive and process a signal indicative of current state of an associated energy supplying utility. The controller operates the refrigerator in one of plurality of operating modes, including at least a normal operating mode and an energy savings mode, in response to the received signal. The controller is configured to at least one of selectively schedule, delay, adjust and deactivate at least one of the one or more power consuming features/functions to reduce power consumption of the refrigerator in the energy savings mode.

27 Claims, 26 Drawing Sheets

U.S. PATENT DOCUMENTS

| | | |
|---|---|---|
| 4,048,812 A | 9/1977 | Thomason |
| 4,167,786 A | 9/1979 | Miller et al. |
| 4,190,756 A | 2/1980 | Foerstner |
| 4,216,658 A | 8/1980 | Baker et al. |
| 4,247,786 A | 1/1981 | Hedges |
| 4,362,970 A | 12/1982 | Grady |
| 4,454,509 A | 6/1984 | Buennagel et al. |
| 4,637,219 A | 1/1987 | Grose |
| 4,659,943 A | 4/1987 | Virant |
| 4,718,403 A | 1/1988 | McCall |
| 4,731,547 A | 3/1988 | Alenduff et al. |
| 4,998,024 A | 3/1991 | Kirk et al. |
| 5,040,724 A | 8/1991 | Brinkruff et al. |
| 5,137,041 A | 8/1992 | Hall et al. |
| 5,183,998 A | 2/1993 | Hoffman et al. |
| 5,220,807 A | 6/1993 | Bourne et al. |
| 5,224,355 A | 7/1993 | So et al. |
| 5,408,578 A | 4/1995 | Bolivar |
| 5,430,430 A | 7/1995 | Gilbert |
| 5,451,843 A | 9/1995 | Kahn et al. |
| 5,462,225 A | 10/1995 | Massara et al. |
| 5,479,157 A | 12/1995 | Suman et al. |
| 5,479,558 A | 12/1995 | White et al. |
| 5,481,140 A | 1/1996 | Maruyama et al. |
| 5,495,551 A | 2/1996 | Robinson et al. |
| 5,504,306 A | 4/1996 | Russell et al. |
| 5,505,377 A | 4/1996 | Weiss |
| 5,515,692 A * | 5/1996 | Sterber et al. ........... 62/154 |
| 5,574,979 A | 11/1996 | West |
| 5,581,132 A | 12/1996 | Chadwick |
| 5,635,895 A | 6/1997 | Murr |
| 5,706,191 A | 1/1998 | Bassett et al. |
| 5,816,491 A | 10/1998 | Berkeley et al. |
| 5,866,880 A | 2/1999 | Seitz et al. |
| 5,874,902 A | 2/1999 | Heinrich et al. |
| 5,880,536 A | 3/1999 | Mardirossian |
| 5,883,802 A | 3/1999 | Harris |
| 5,886,647 A | 3/1999 | Badger et al. |
| 5,926,776 A | 7/1999 | Glorioso et al. |
| 5,956,462 A | 9/1999 | Langford |
| 6,018,150 A | 1/2000 | Maher, Jr. |
| 6,026,651 A | 2/2000 | Sandelman |
| 6,080,971 A | 6/2000 | Seitz |
| 6,118,099 A | 9/2000 | Lake |
| 6,179,213 B1 | 1/2001 | Gibino et al. |
| 6,185,483 B1 | 2/2001 | Drees |
| 6,229,433 B1 | 5/2001 | Rye et al. |
| 6,246,831 B1 | 6/2001 | Seitz et al. |
| 6,380,866 B1 | 4/2002 | Sizer et al. |
| 6,400,103 B1 | 6/2002 | Adamson |
| 6,480,753 B1 | 11/2002 | Calder et al. |
| 6,489,597 B1 | 12/2002 | Hornung |
| 6,553,595 B1 | 4/2003 | Bruntz et al. |
| 6,631,622 B1 * | 10/2003 | Ghent et al. ........... 62/231 |
| 6,694,753 B1 * | 2/2004 | Lanz et al. ........... 62/155 |
| 6,694,927 B1 | 2/2004 | Pouchak et al. |
| 6,704,401 B2 | 3/2004 | Piepho et al. |
| 6,778,868 B2 | 8/2004 | Imamura et al. |
| 6,784,872 B1 | 8/2004 | Matsui et al. |
| 6,806,446 B1 | 10/2004 | Neale |
| 6,817,195 B2 | 11/2004 | Rafalovich et al. |
| 6,828,695 B1 | 12/2004 | Hansen |
| 6,873,876 B1 | 3/2005 | Aisa |
| 6,879,059 B2 | 4/2005 | Sleva |
| 6,904,385 B1 | 6/2005 | Budike |
| 6,922,598 B2 | 7/2005 | Lim et al. |
| 6,943,321 B2 | 9/2005 | Carbone et al. |
| 6,961,642 B2 | 11/2005 | Horst |
| 6,983,210 B2 | 1/2006 | Matsubayashi et al. |
| 7,039,575 B2 | 5/2006 | Juneau |
| 7,043,380 B2 | 5/2006 | Rodenberg et al. |
| 7,053,790 B2 | 5/2006 | Jang et al. |
| 7,057,140 B2 | 6/2006 | Pittman |
| 7,069,090 B2 | 6/2006 | Huffington et al. |
| 7,082,380 B2 | 7/2006 | Wiebe et al. |
| 7,110,832 B2 | 9/2006 | Ghent |
| 7,155,305 B2 | 12/2006 | Hayes et al. |
| 7,164,851 B2 | 1/2007 | Sturm et al. |
| 7,206,670 B2 | 4/2007 | Pimputkar et al. |
| 7,266,962 B2 | 9/2007 | Montuoro et al. |
| 7,274,973 B2 | 9/2007 | Nichols et al. |
| 7,274,975 B2 | 9/2007 | Miller et al. |
| 7,368,686 B2 | 5/2008 | Etheredge et al. |
| 7,372,002 B2 | 5/2008 | Nakamura et al. |
| 7,420,140 B2 | 9/2008 | Lenhart et al. |
| 7,420,293 B2 | 9/2008 | Donnelly et al. |
| 7,446,646 B2 | 11/2008 | Huomo |
| 7,478,070 B2 | 1/2009 | Fukui et al. |
| 7,561,977 B2 * | 7/2009 | Horst et al. ........... 702/62 |
| 7,685,849 B2 | 3/2010 | Worthington |
| 7,720,035 B2 | 5/2010 | Oh et al. |
| 7,751,339 B2 | 7/2010 | Melton et al. |
| 7,783,390 B2 | 8/2010 | Miller |
| 7,919,729 B2 | 4/2011 | Hsu |
| 7,925,388 B2 | 4/2011 | Ying |
| 7,962,248 B2 | 6/2011 | Flohr |
| 7,991,513 B2 | 8/2011 | Pitt |
| 8,024,073 B2 | 9/2011 | Imes et al. |
| 8,027,752 B2 | 9/2011 | Castaldo et al. |
| 8,033,686 B2 | 10/2011 | Recker et al. |
| 8,094,037 B2 | 1/2012 | Unger |
| 8,185,252 B2 * | 5/2012 | Besore ........... 700/299 |
| 8,190,302 B2 | 5/2012 | Burt et al. |
| 8,355,748 B2 | 1/2013 | Abe et al. |
| 2001/0025349 A1 | 9/2001 | Sharood et al. |
| 2001/0048361 A1 | 12/2001 | Mays et al. |
| 2002/0024332 A1 | 2/2002 | Gardner |
| 2002/0071689 A1 | 6/2002 | Miyamoto |
| 2002/0125246 A1 | 9/2002 | Cho et al. |
| 2002/0175806 A1 | 11/2002 | Marneweck et al. |
| 2002/0196124 A1 | 12/2002 | Howard et al. |
| 2002/0198629 A1 | 12/2002 | Ellis |
| 2003/0036820 A1 | 2/2003 | Yellepeddy et al. |
| 2003/0043845 A1 | 3/2003 | Lim et al. |
| 2003/0178894 A1 | 9/2003 | Ghent |
| 2003/0193405 A1 | 10/2003 | Hunt et al. |
| 2003/0194979 A1 | 10/2003 | Richards et al. |
| 2003/0233201 A1 | 12/2003 | Horst et al. |
| 2004/0024483 A1 | 2/2004 | Holcombe |
| 2004/0034484 A1 | 2/2004 | Solomita et al. |
| 2004/0098171 A1 | 5/2004 | Horst |
| 2004/0100199 A1 | 5/2004 | Yang |
| 2004/0107510 A1 | 6/2004 | Buckroyd et al. |
| 2004/0112070 A1 | 6/2004 | Schanin |
| 2004/0117330 A1 | 6/2004 | Ehlers et al. |
| 2004/0118008 A1 | 6/2004 | Jeong et al. |
| 2004/0128266 A1 | 7/2004 | Yellepeddy et al. |
| 2004/0133314 A1 | 7/2004 | Ehlers et al. |
| 2004/0139038 A1 | 7/2004 | Ehlers et al. |
| 2004/0254654 A1 | 12/2004 | Donnelly et al. |
| 2005/0011205 A1 | 1/2005 | Holmes et al. |
| 2005/0134469 A1 | 6/2005 | Odorcic et al. |
| 2005/0138929 A1 | 6/2005 | Enis et al. |
| 2005/0173401 A1 | 8/2005 | Bakanowski et al. |
| 2005/0184046 A1 | 8/2005 | Sterling |
| 2005/0190074 A1 | 9/2005 | Cumeralto et al. |
| 2006/0031180 A1 | 2/2006 | Tamarkin et al. |
| 2006/0036338 A1 | 2/2006 | Harkcom et al. |
| 2006/0068728 A1 | 3/2006 | Ishidoshiro et al. |
| 2006/0095164 A1 | 5/2006 | Donnelly et al. |
| 2006/0123807 A1 | 6/2006 | Sullivan et al. |
| 2006/0159043 A1 | 7/2006 | Delp et al. |
| 2006/0190139 A1 | 8/2006 | Reaume et al. |
| 2006/0208570 A1 | 9/2006 | Christian et al. |
| 2006/0272830 A1 | 12/2006 | Fima et al. |
| 2006/0276938 A1 | 12/2006 | Miller |
| 2006/0289436 A1 | 12/2006 | Carbone et al. |
| 2007/0005195 A1 | 1/2007 | Pasquale et al. |
| 2007/0030116 A1 | 2/2007 | Feher |
| 2007/0043478 A1 | 2/2007 | Ehlers et al. |
| 2007/0136217 A1 | 6/2007 | Johnson et al. |
| 2007/0151311 A1 | 7/2007 | McAllister et al. |
| 2007/0185675 A1 | 8/2007 | Papamichael et al. |
| 2007/0203860 A1 | 8/2007 | Golden et al. |
| 2007/0213880 A1 | 9/2007 | Ehlers |
| 2007/0220907 A1 | 9/2007 | Ehlers |
| 2007/0229236 A1 | 10/2007 | Mercer et al. |

| | | | |
|---|---|---|---|
| 2007/0271006 A1 | 11/2007 | Golden et al. | |
| 2007/0276547 A1 | 11/2007 | Miller | |
| 2008/0029081 A1 | 2/2008 | Gagas et al. | |
| 2008/0034768 A1 | 2/2008 | Pimentel et al. | |
| 2008/0083729 A1 | 4/2008 | Etheredge et al. | |
| 2008/0106147 A1 | 5/2008 | Caggiano et al. | |
| 2008/0120790 A1 | 5/2008 | Ashrafzadeh et al. | |
| 2008/0122585 A1 | 5/2008 | Castaldo et al. | |
| 2008/0136581 A1 | 6/2008 | Heilman et al. | |
| 2008/0144550 A1 | 6/2008 | Makhlouf et al. | |
| 2008/0167756 A1 | 7/2008 | Golden et al. | |
| 2008/0167931 A1 | 7/2008 | Gerstemeier et al. | |
| 2008/0172312 A1 | 7/2008 | Synesiou et al. | |
| 2008/0177678 A1 | 7/2008 | Di Martini et al. | |
| 2008/0204240 A1 | 8/2008 | Hilgers et al. | |
| 2008/0215263 A1 | 9/2008 | Flohr | |
| 2008/0258633 A1 | 10/2008 | Voysey | |
| 2008/0272934 A1 | 11/2008 | Wang et al. | |
| 2008/0277487 A1 | 11/2008 | Mueller et al. | |
| 2009/0006878 A1 | 1/2009 | Borghetti et al. | |
| 2009/0038369 A1 | 2/2009 | Vondras | |
| 2009/0063257 A1 | 3/2009 | Zak et al. | |
| 2009/0105888 A1 | 4/2009 | Flohr et al. | |
| 2009/0146838 A1 | 6/2009 | Katz | |
| 2009/0235675 A1 | 9/2009 | Chang et al. | |
| 2009/0240381 A1 | 9/2009 | Lane | |
| 2009/0326728 A1 | 12/2009 | Chrisop et al. | |
| 2010/0017242 A1 | 1/2010 | Hamilton et al. | |
| 2010/0070091 A1* | 3/2010 | Watson et al. | 700/278 |
| 2010/0092625 A1 | 4/2010 | Finch et al. | |
| 2010/0131117 A1 | 5/2010 | Mattiocco et al. | |
| 2010/0175719 A1 | 7/2010 | Finch et al. | |
| 2010/0179708 A1 | 7/2010 | Watson et al. | |
| 2010/0262963 A1 | 10/2010 | Wassermann et al. | |
| 2010/0301774 A1 | 12/2010 | Chemel et al. | |
| 2011/0001438 A1 | 1/2011 | Chemel et al. | |
| 2011/0062142 A1 | 3/2011 | Steurer | |
| 2011/0085287 A1 | 4/2011 | Ebrom et al. | |
| 2011/0087382 A1 | 4/2011 | Santacatterina et al. | |
| 2011/0095017 A1 | 4/2011 | Steurer | |
| 2011/0106328 A1 | 5/2011 | Zhou et al. | |
| 2011/0114627 A1 | 5/2011 | Burt | |
| 2011/0123179 A1 | 5/2011 | Roetker et al. | |
| 2011/0148390 A1 | 6/2011 | Burt et al. | |
| 2011/0290781 A1 | 12/2011 | Burt et al. | |
| 2012/0054123 A1 | 3/2012 | Broniak et al. | |

FOREIGN PATENT DOCUMENTS

| | | |
|---|---|---|
| EP | 1496324 A1 | 1/2005 |
| GB | 2105127 A | 3/1983 |
| JP | 11313441 A2 | 11/1999 |
| KR | 20060085711 A | 7/2006 |
| WO | 86/00976 A1 | 2/1986 |
| WO | 90/12261 A1 | 10/1990 |
| WO | 98/48335 A1 | 10/1998 |
| WO | 2007/060059 A1 | 5/2007 |
| WO | 2007136456 A2 | 11/2007 |

OTHER PUBLICATIONS

International Search Report from PCT Application No. PCT/US2009/056878, Nov. 17, 2009.

International Search Report from PCT Application No. PCT/US2009/056882, Nov. 4, 2009.

International Search Report from PCT Application No. PCT/US2009/056883, Oct. 26, 2009.

International Search Report from PCT Application No. PCT/US2009/056886, Nov. 5, 2009.

International Search Report from PCT Application No. PCT/US2009/056889, Nov. 10, 2009.

International Search Report from PCT Application No. PCT/US2009/056894, Nov. 13, 2009.

International Search Report from PCT Application No. PCT/US2009/056895, Nov. 9, 2009.

International Search Report from PCT Application No. PCT/US2009/056901, Nov. 10, 2009.

International Search Report from PCT Application No. PCT/US2009/056906, Nov. 10, 2009.

International Search Report from PCT Application No. PCT/US2009/056913, Nov. 10, 2009.

International Search Report from PCT Application No. PCT/US2009/056914, Nov. 2, 2009.

International Search Report from PCT Application No. PCT/US2009/056919, Nov. 2, 2009.

Search Report from EP Application No. 10153695.1, May 24, 2012.

Lemay et al., An Integrated Architecture for Demand Response Communications and Control, University of Illinois Urbana-Champaign, Oct. 28, 2008.

Real-Time Feedback, Natural Resources Canada via website www.nrcan.gc.ca , 2008, http://oee.nrcan.gc.ca/publications/equipment/10918.

Search Report from CN Application No. 201010135268.8 dated Oct. 24, 2012.

* cited by examiner

| | | | |
|---|---|---|---|
| REFRIGERATOR | REFR UI RESPONSE (DSM DISABLED) | DURING OPERATION | NORMAL DISPLAY |
| | REFR UI RESPONSE (DSM ENABLED) | DURING OPERATION | DISPLAY "ECO RATE LOW-NORMAL OPERATION" |
| WASHER | DRYER UI RESPONSE (DSM DISABLED) | PRIOR TO OPERATION | NORMAL DISPLAY |
| | DRYER UI RESPONSE (DSM DISABLED) | DURING OPERATION | NORMAL DISPLAY |
| | WASHER UI RESPONSE (DSM ENABLED) | PRIOR TO OPERATION | NORMAL DISPLAY |
| | WASHER UI RESPONSE (DSM ENABLED) | DURING OPERATION | NORMAL DISPLAY |
| DRYER | DRYER UI RESPONSE (DSM DISABLED) | PRIOR TO OPERATION | NORMAL DISPLAY |
| | DRYER UI RESPONSE (DSM DISABLED) | DURING OPERATION | NORMAL DISPLAY |
| | DRYER UI RESPONSE (DSM ENABLED) | PRIOR TO OPERATION | NORMAL DISPLAY |
| | DRYER UI RESPONSE (DSM ENABLED) | DURING OPERATION | NORMAL DISPLAY |
| RANGE | RANGE UI RESPONSE (DSM DISABLED OR NORMAL) | PRIOR TO OPERATION | NORMAL DISPLAY |
| | | DURING OPERATION | NORMAL DISPLAY |
| | RANGE UI RESPONSE (DSM ENABLED) | PRIOR TO OPERATION | NORMAL DISPLAY |
| | | DURING OPERATION | NORMAL DISPLAY |
| DISHWASHER | DISHWASHER UI RESPONSE (DSM DISABLED OR NORMAL) | PRIOR TO OPERATION | NORMAL DISPLAY |
| | | DURING OPERATION | NORMAL DISPLAY |
| | DISHWASHER UI RESPONSE (DSM ENABLED) | PRIOR TO OPERATION | NORMAL DISPLAY |
| | | DURING OPERATION | NORMAL DISPLAY |
| MWO | DISHWASHER UI RESPONSE (DSM DISABLED OR NORMAL) | PRIOR TO OPERATION | NORMAL DISPLAY |
| | | DURING OPERATION | NORMAL DISPLAY |
| | DISHWASHER UI RESPONSE (DSM ENABLED) | PRIOR TO OPERATION | NORMAL DISPLAY |
| | | DURING OPERATION | NORMAL DISPLAY |

MATCH TO FIG. 9B

Fig. 9A

| MEDIUM | HIGH | CRITICAL |
|---|---|---|
| NORMAL DISPLAY | NORMAL DISPLAY | NORMAL DISPLAY |
| DISPLAY "ECO RATE MEDIUM-NORMAL OPERATION" | DISPLAY "ECO RATE HIGH - FEATURES DELAYED" | DISPLAY "ECO RATE CRITICAL - FEATURES DELAYED" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "DELAY ECO" | DISPLAY "DELAY ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "DELAY ECO" | DISPLAY "DELAY ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "ECO" | DISPLAY "ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| DISPLAY "ECO" | DISPLAY "ECO" | DISPLAY "ECO" |
| DISPLAY "ECO" | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "ECO" | DISPLAY "ECO" |
| NORMAL DISPLAY | DISPLAY "ECO" | DISPLAY "ECO" |

MATCH TO FIG. 9A

Fig. 9B

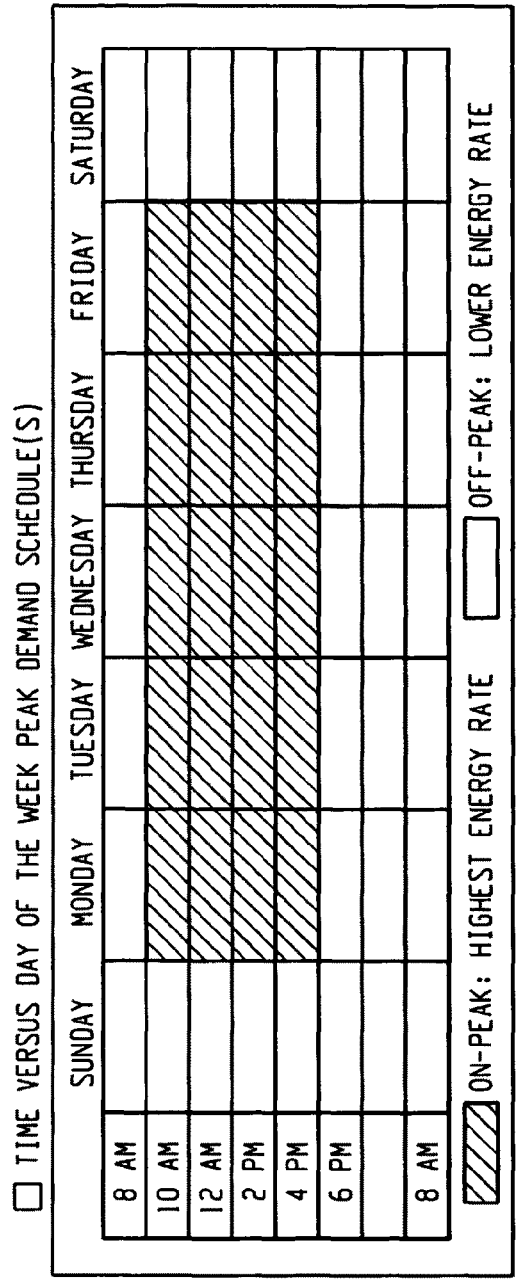

ELECTRIC POWER UTILITY - TIME OF USE - AS APPLIED TO REFRIGERATION

BACKGROUND

TIME-OF-USE IS A VOLUNTARY ELECTRIC UTILITY PROGRAM WHICH ALLOWS A CONSUMER TO PURCHASE LOWER PRICED ELECTRIC POWER BY USING POWER WHEN THE "GRID" ELECTRIC DEMAND IS LESS. THE TIME-OF-USE SCHEDULE IS GENERALLY WORKED OUT WITH THE REGIONAL POWER COMPANY AND LEGISLATORS AND THE SCHEDULE IS WELL KNOWN AND EASILY OBTAINED BY THE CONSUMER.

PARTS OF THE SYSTEM

SYSTEM IMPLEMENTATION HAS THREE UNIQUE CATEGORIES AND ARE LISTED BELOW:

(1) METHOD OF INPUTTING THE TIME-OF-USE SCHEDULE (A) CONSUMER ZIP CODE ENTRY - REQUIRES A DATABASE MANAGED BY GE AND UPGRADEABLE (B) TIME VERSUS DAY OF THE WEEK PEAK DEMAND SCHEDULE WITH USER INPUT - REQUIRES INITIAL INPUT BY CONSUMER AND DATABASE MANAGED BY USER WHEN CHANGES HAPPEN (2) ELECTRONIC CIRCUIT CHANGES REQUIRED - CIRCUITRY THAT KEEPS TIME WILL BE REQUIRED AND SOFTWARE TO INTERACT WITH THE TIME-OF-USE SCHEDULE INPUT AND ACTIONS WOULD BE REQUIRED (A) ONE METHOD WOULD BE A ZERO CROSS (B) ANOTHER METHOD WOULD BE A CLOCK CALENDAR IC WITH CAPACITOR OR BATTERY BACKUP (3) A LIST OF ACTIONS THAT COULD BE PERFORMED AT TIMES WHEN THE ELECTRIC RATES ARE OFF PEAK (A) DELAY DEFROST UNTIL OFF PEAK (B) PRECHILL WHEN NEARING PEAK DEMAND TO KEEP THE COMPRESSOR USAGE AT A MINIMUM DURING PEAK DEMAND (C) ALERT USER WHEN PEAK DEMAND IS ON WHEN THE DOORS ARE OPENED (LIGHT ELECTRIC DRAW) OR WHEN THE ICE DISPENSER IS USED DURING PEAK DEMAND

*Fig. 11*

A LIST OF ACTIONS THAT COULD BE PERFORMED AT TIMES WHEN THE ELECTRIC RATES ARE OFF PEAK

- DELAY DEFROST UNTIL OFF PEAK
- PRECHILL WHEN NEARING PEAK DEMAND TO KEEP THE COMPRESSOR USAGE AT A MINIMUM DURING PEAK DEMAND
- ALERT USER WHEN PEAK DEMAND IS ON - OCCURS WHEN THE DOOR WAS OPENED OR ICE CRUSHER USED, ETC.

*Fig. 20*

TITLE: APPLIANCE ACTIONS AND RESPONSE - DEMAND SIDE MANAGEMENT FOR HOME APPLIANCES
ABSTRACT: THE INVENTION(S) ARE THE APPLIANCE ACTIONS AND RESPONSES TO ELECTRIC UTILITY SIGNALS PROVIDED IN CONJUNCTION WITH A DEMAND SIDE MANAGEMENT (DSM) SYSTEM. THIS IS PART OF THE ADVANCED METERING INFRASTRUCTURE (AMI) INITIATIVE WHICH PROVIDES REMOTE METERING FUNCTIONS SUCH AS REMOTE METER READING, DEMAND SIGNALING/LOAD CONTROL, ETC.. THE ATTACHED DOCUMENT DESCRIBES IN BRIEF DETAIL ACTIONS AND RESPONSES TO DSM SIGNALING.

UPON RECEIVING A HIGH PRICE ENERGY SIGNAL THE USER MAY SET THE UNIT TO:

a) DELAY ALL SPECIAL MODES UNTIL THE LOW PRICED ENERGY SIGNAL IS RECEIVED. MODE EXAMPLES ARE:
　　i. ICE MAKER
　　ii. BEVERAGE CENTER
　　iii. TURBO COOL
　　iv. CUSTOM COOL
　　v. QUICK ICE b) OVERRIDE THE HIGH PRICED ENERGY SIGNAL, ALWAYS OR BASED ON A CERTAIN $/Kwh LEVEL c) DELAY DEFROST UNTIL PEFORMANCE IS WOULD BE AFFECTED d) ANNOUNCE OR AUDIBLE ALERT OF THE "HIGH PRICED ENERGY SIGNAL" DURING A CYCLE e) VISUALLY ALERT USER OF THE "HIGH PRICED ENERGY" SIGNAL f) DISPLAY THE COST OF RUNNING THE UNIT IN THE SELECTED MODE OF OPERATION g) DISPLAY THE COST OF ENERGY AT THE PRESENT TIME h) DISABLE LIGHTING i) TURN OFF SWEAT HEATERS

*Fig. 21*

REFRIGERATOR CONTROL RESPONSE

| | | UTILITY RATE | | | |
|---|---|---|---|---|---|
| | | LOW | MEDIUM | HIGH | CRITICAL |
| APPLIANCE RESPONSE | OPERATION (GRID) | NORMAL | NORMAL | INCREASE FZ SETPOINT TO HIGH SETTING | INCREASE FZ SETPOINT TO HIGH SETTING |
| | SPECIAL MODES | AS SELECTED BY CONSUMER | AS SELECTED BY CONSUMER | DISABLE FAST FREEZE, QUICK ICE, TURBO COOL, BEV CENTER FAN | DISABLE FAST FREEZE, QUICK ICE, TURBO COOL, BEV CENTER FAN |
| | I AND W | NORMAL | NORMAL | NORMAL | NORMAL |
| | DEFROST | NORMAL - PER DEFROST TIMER | DEFROST INITIATED EARLY IF NEAR TIME LIMIT | DEFROST DELAYED UNLESS PERFORMANCE DEGRADATION | DEFROST DELAYED UNLESS PERFORMANCE DEGRADATION |
| | SWEAT HEATERS | NORMAL | NORMAL | NORMAL | DISABLE ELECTRICALLY CONTROLLED SWEAT HEATERS |
| | LIGHTING | NORMAL | NORMAL | | NORMAL |
| REFRIGERATOR UI RESPONSE (DSM DISABLED OR NORMAL) | DURING OPERATION | NORMAL DISPLAY | NORMAL DISPLAY | NORMAL DISPLAY | NORMAL DISPLAY |
| REFRIGERATOR UI RESPONSE (DSM ENABLED) | DURING OPERATION | DISPLAY "ECO RATE LOW - NORMAL OPERATION" | DISPLAY "ECO RATE MEDIUM - NORMAL OPERATION" | DISPLAY "ECO RATE HIGH - FEATURES DELAYED" | DISPLAY "ECO RATE CRITICAL - FEATURES DELAYED" |

Fig. 26

ENERGY MANAGEMENT OF HOUSEHOLD APPLIANCES

CROSS REFERENCE TO RELATED APPLICATIONS

The present application claims priority from U.S. Provisional Patent Application Ser. No. 61/097,082 filed 15 Sep. 2008, now Ser. No. 12/559,703, filed 15 Sep. 2009; which provisional patent application is expressly incorporated herein by reference, in its entirety. In addition, cross-reference is made to commonly owned, copending application Ser. No. 12/559,636, filed 15 Sep. 2009; Ser. No. 12/559,528, filed 15 Sep. 2009; Ser. No. 12/559,539, filed 15 Sep. 2009; Ser. No. 12/559,654, filed 15 Sep. 2009; Ser. No. 12/559,581, filed 15 Sep. 2009; Ser. No. 12/559,550, filed 15 Sep. 2009; Ser. No. 12/559,597; filed 15 Sep. 2009; Ser. No. 12/559,705, filed 15 Sep. 2009; Ser. No. 12/559,561, filed 15 Sep. 2009; Ser. No. 12/559,577, filed 15 Sep. 2009; and Ser. No. 12/559,684, filed 15 Sep. 2009.

BACKGROUND

This disclosure relates to energy management, and more particularly to energy management of household consumer appliances. The disclosure finds particular application to changing existing appliances via add-on features or modules, and incorporating new energy saving features and functions into new appliances.

Currently utilities charge a flat rate, but with increasing cost of fuel prices and high energy usage at certain parts of the day, utilities have to buy more energy to supply customers during peak demand. Consequently, utilities are charging higher rates during peak demand. If peak demand can be lowered, then a potential huge cost savings can be achieved and the peak load that the utility has to accommodate is lessened.

One proposed third party solution is to provide a system where a controller "switches" the actual energy supply to the appliance or control unit on and off. However, there is no active control beyond the mere on/off switching. It is believed that others in the industry cease some operations in a refrigerator during on-peak time.

For example, in a refrigerator most energy is consumed to keep average freezer compartment temperature at a constant level. Recommended temperature level is based on bacteria multiplication. Normally recommended freezer temperature for long (1-2 month) food storage is 0 degrees F. Research shows that bacteria rise is a linear function of the compartment temperature, i.e., the lower the temperature the lower the bacteria multiplication. Refrigerator designers now use this knowledge to prechill a freezer compartment (and in less degree a refrigerator compartment also) before defrost, thus keeping an average temperature during time interval that includes before, during, and after defrost at approximately the same level (for example, 0 degrees F.).

There are also currently different methods used to determine when variable electricity-pricing schemes go into effect. There are phone lines, schedules, and wireless signals sent by the electrical company. One difficulty is that no peak shaving method for an appliance such as a refrigerator will provide a maximal benefit. Further, different electrical companies use different methods of communicating periods of high electrical demand to their consumers. Other electrical companies simply have rate schedules for different times of day.

Electrical utilities moving to an Advanced Metering Infrastructure (AMI) system will need to communicate to appliances, HVAC, water heaters, etc. in a home or office building. All electrical utility companies (more than 3,000 in the US) will not be using the same communication method to signal in the AMI system. Similarly, known systems do not communicate directly with the appliance using a variety of communication methods and protocols, nor is a modular and standard method created for communication devices to interface and to communicate operational modes to the main controller of the appliance. Although conventional WiFi/ZigBee/PLC communication solutions are becoming commonplace, this disclosure introduces numerous additional lower cost, reliable solutions to trigger "load shedding" responses in appliances or other users of power. This system may also utilize the commonplace solutions as parts of the communication protocols.

BRIEF DESCRIPTION OF THE DISCLOSURE

According to one aspect, a refrigerator comprises a fresh food compartment and a freezer compartment and one or more power consuming features/functions including a refrigeration system for cooling the fresh food compartment and the freezer compartment. A controller is operatively connected to the one or more power consuming features/functions. The controller is configured to receive and process a signal indicative of current state of an associated energy supplying utility. The controller operates the refrigerator in one of plurality of operating modes, including at least a normal operating mode and an energy savings mode, in response to the received signal. The controller is configured to at least one of selectively schedule, delay, adjust and deactivate at least one of the one or more power consuming features/functions to reduce power consumption of the refrigerator in the energy savings mode.

According to another aspect, a refrigerator control method is provided. A state for an associated energy supplying utility is determined. The utility state is indicative of at least a peak demand period or an off-peak demand period. The refrigerator is operated in a normal mode during the off-peak demand period. The refrigerator is operated in an energy savings mode during the peak demand period. Any number of one or more power consuming features/functions of the refrigerator is selectively scheduled, delayed, adjusted and/or deactivated to reduce power consumption of the refrigerator in the energy savings mode, including increasing a setpoint temperature of a freezer compartment to precipitate less compressor on time in the energy savings mode. The normal mode is returned to after the peak demand period is over.

According to yet another aspect, a refrigerator comprises a fresh food compartment having a targeted setpoint temperature, a freezer compartment having a targeted setpoint temperature, and an automatic defrost cycle having a scheduled on-time. A refrigeration system cools each of the fresh food compartment and the freezer compartment to its targeted setpoint temperature. A controller is configured to receive and process an energy signal. The signal has a first state indicative of a utility peak demand period and a second state indicative of a utility off-peak demand period. The controller operates the refrigerator in one of an energy savings mode and a normal operating mode based on the received signal being in the first and second states respectively. The controller is configured to increase the setpoint temperature of at least one of fresh food compartment and the freezer compartment in the energy savings mode. The controller is configured to delay activation of the defrost cycle if the scheduled on-time occurs in the energy savings mode unless performance degradation of the refrigerator is detected.

The present disclosure reduces power consumption during on-peak hours by reducing the energy demand on the power generation facility, and also enabling the user/consumer to pay less to operate the appliance on an annual basis.

This disclosure is a low-cost alternative to using expensive or complicated methods of determining when peak electrical rates apply. For example, when the refrigerator is in peak shaving mode (or it could be programmed to do this constantly), an ambient light sensor determines when it is morning, and then stays in energy-saving mode for a predetermined number of hours. Preferably, the system will need a counter to know that the room has been dark for a predetermined number of hours. When the lights come on for a certain length of time, then the system knows, for example, that it is morning.

This disclosure provides a peak-shaving appliance such as a refrigerator, including a method to determine when to go into peak-shaving mode without using additional components, or components that have another purpose, and provides a high percentage of the maximum benefit for negligible cost. The two components needed for this are an ambient light sensor and a timer. The kitchen will be dark for an extended period of time while everyone is sleeping. The light sensor and the timer will be used to determine that it is nighttime and morning can be determined by the light sensor. When the refrigerator determines it is morning, the timer will be used to initiate peak shaving mode after some delay time. For example, peak shaving mode could start three hours after it is determined morning starts. Similarly, the ambient light sensor can also be used for dimming the refrigerator lights. This disclosure advantageously uses ambient light to determine when to start peak shaving.

An appliance interface can be provided for all appliances leaving the module to communicate with the AMI system. The system provides for appliance sales with a Demand Side Management capable appliance. The Demand Side Management Module (DSMM) is provided to control the energy consumption and control functions of an appliance using a communication method (including but not limited to PLC, FM, AM SSB, WiFi, ZigBee, Radio Broadcast Data System, 802.11, 802.15.4, etc.). The modular approach will enable an appliance to match electrical utility communication requirements. Each electrical utility region may have different communication methods, protocol methods, etc. This modular approach allows an appliance to be adapted to a particular geographical area of a consumer or a particular electrical provider. The module can be added as a follow on feature and applied after the appliance is installed. Typical installations could include an integral mounted module (inside the appliance or unit) or an externally mounted module (at the wall electrical receptacle or anywhere outside the appliance or unit). The module in this disclosure provides for 2 way communications if needed, and will provide for several states of operation—for example, 1) normal operation, 2) operation in low energy mode (but not off), and 3) operation in lowest energy mode.

This module could be powered from the appliance or via a separate power supply, or with rechargeable batteries. The rechargeable batteries could be set to charge under off-peak conditions. With the module powered from the appliance, the appliance could turn it off until the appliance needed to make a decision about power usage, eliminating the standby power draw of the module. If powered separately, the appliance could go to a low energy state or completely off, while the module continued to monitor rates.

Use of RFID tags in one proposed system should offer significant savings since the RFID tags have become very low cost due to the proliferation of these devices in retail and will effectively allow the enabled appliance to effectively communicate with the utility meter (e.g., receive signals from the utility meter). This system makes it very easy for a customer to manage energy usage during peak demand periods and lowers the inconvenience level to the customer by not shutting off appliances in the home by the utility. When local storage and local generation are integrated into the system, then cost savings are seen by the customer. This system also solves the issue of rolling brownouts/blackouts caused by excessive power demand by lowering the overall demand. Also, the system allows the customer to pre-program choices into the system that will ultimately lower utility demand as well as save the customer money in the customer's utility billing. For instance, the customer may choose to disable the defrost cycle of a refrigerator during peak rate timeframes. This disclosure provides for the controller to "communicate" with the internal appliance control board and command the appliance to execute specific actions with no curtailment in the energy supply. This disclosure further provides a method of communicating data between a master device and one or more slave devices using RFID technology. This can be a number of states or signals, either using one or more passive RFID tags that resonate at different frequencies resonated by the master, or one or more active RFID tags that can store data that can be manipulated by the master device and read by the slave device (s). The states in either the passive or active RFID tags can then be read by the microcontroller on the slave device(s) and appropriate functions/actions can be taken based upon these signals.

Another exemplary embodiment uses continuous coded tones riding on carrier frequencies to transmit intelligence, for example, when one is merely passing rate information such as rate 1, 2, 3, or 4, using the tones to transmit the signals. One could further enhance the details of the messaging by assigning a binary number to a given tone, thus allowing one to "spell out" a message using binary coding with multiple tones. The appliance microcomputer would be programmed to respond to a given number that would arrive in binary format.

One advantage of this approach is that customers have complete control of their power. There have been proposals by utilities to shut off customers if they exceed demand limits or increase the number of rolling brownouts. This method also gives a customer finer granulity in their home in terms of control. A customer does not have to load shed a room just to manage a single device.

This disclosure also advantageously provides modes of load shedding in the appliance, lighting, or HVAC other than "on/off" to make the situation more acceptable from the perspective of the customer.

An advantage of the present disclosure is the ability to produce appliances with a common interface and let the module deal with the Demand Side Management.

Another advantage is the ability to control functions and features within the appliance and/or unit at various energy levels, i.e., as opposed to just an on/off function.

Another advantage is that the consumer can choose the module or choose not to have the module. If the module is chosen, it can be matched to the particular electrical utility service provider communication method of the consumer.

Another benefit is the increased flexibility with an associated electrical service provider, and the provision of several modes of operation (not simply an on/off mode). The module can be placed or positioned inside or outside the appliance and/or unit to provide demand side management.

Still other benefits relate to modularity, the ability to handle multiple communication methods and protocols without adversely impacting the cost of the appliance, opening up appliances to a variety of protocols, enabling demand side management or energy management, and/or providing for a standard interface to the appliance (for example, offering prechill and/or temperature set change during on-peak hours).

Low cost, reliable RF transmissions within the home, rather than using industrial solutions such as PLC or Zigbee solutions which are significantly more costly than the aforementioned system.

Still other features and benefits of the present disclosure will become apparent from reading and understanding the following detailed description.

BRIEF DESCRIPTION OF THE DRAWINGS

FIGS. 1-8, 9A, 9B, and 10-21 illustrate exemplary embodiments of an energy management system for household appliances.

FIG. 26 is an exemplary control response for the refrigerator of FIG. 22.

DETAILED DESCRIPTION OF THE PREFERRED EMBODIMENTS

Figure 1:
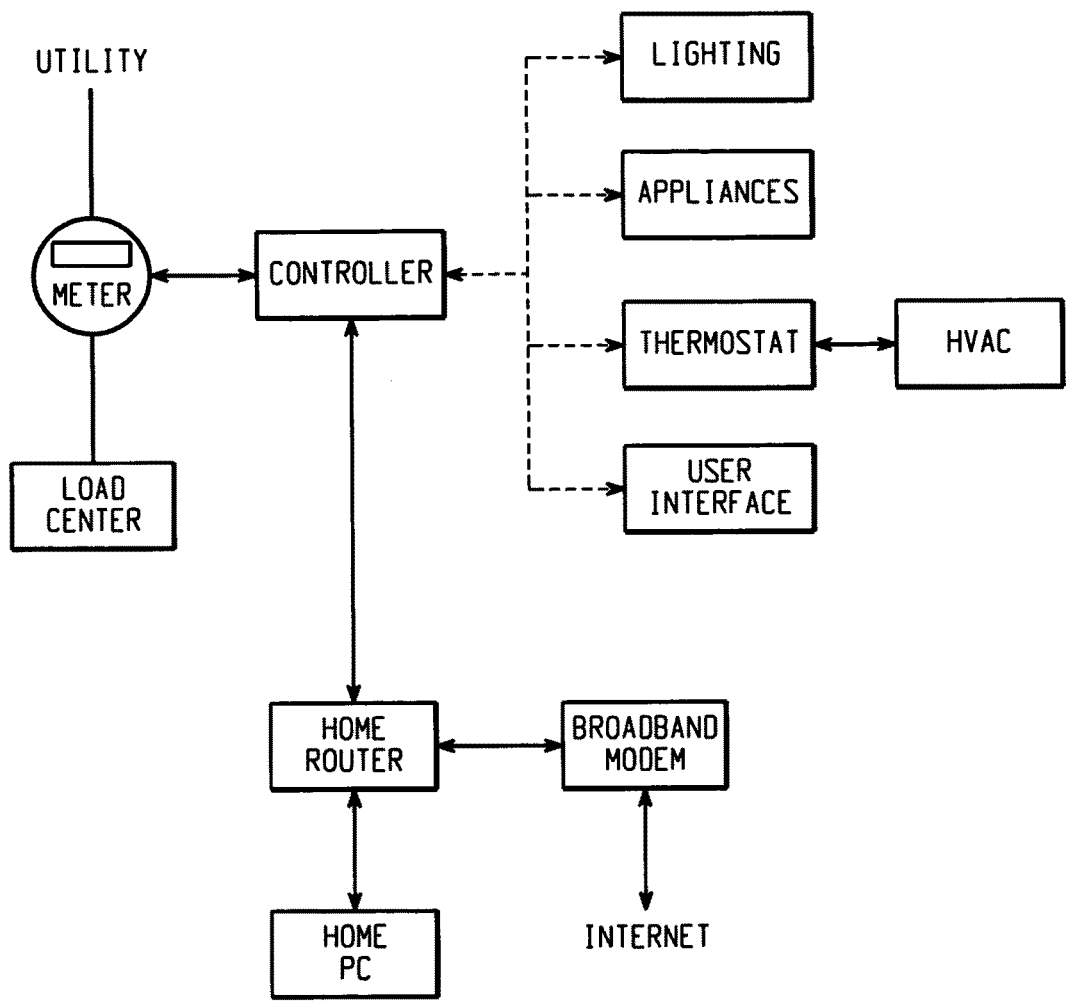
Figure 2:
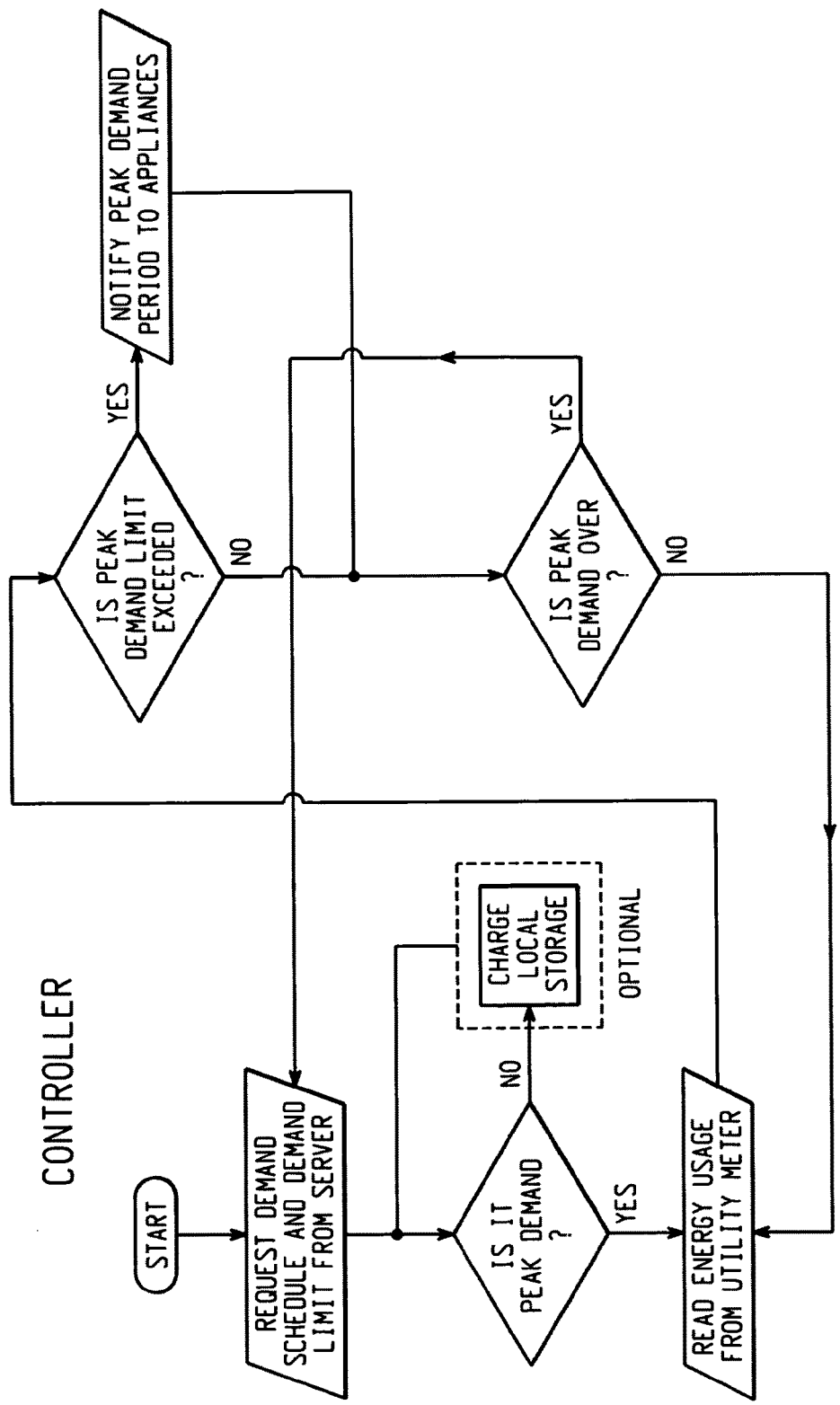

In one embodiment, a more advanced system is provided to handle energy management between the utility and the homeowner's appliances. The system can include one or more of the following: a controller, utility meter, communication network, intelligent appliances, local storage, local generator and/or demand server. Less advanced systems may actually allow the appliance to "communicate directly with the utility meter or mesh network through the DSSM (Demand Side Management Module) (FIG. 1). The demand server is a computer system that notifies the controller when the utility is in peak demand and what is the utility's current demand limit. A utility meter can also provide the controller the occurrence of peak demand and demand limit. The demand limit can also be set by the home owner. Additionally, the homeowner can choose to force various modes in the appliance control based on the rate the utility is charging at different times of the day. The controller will look at the energy consumption currently used by the home via the utility meter and see if the home is exceeding the demand limit read from the server. If the demand limit is exceeded, the controller will notify the intelligent appliances, lighting and thermostat/HVAC (FIG. 2).

Figure 3:
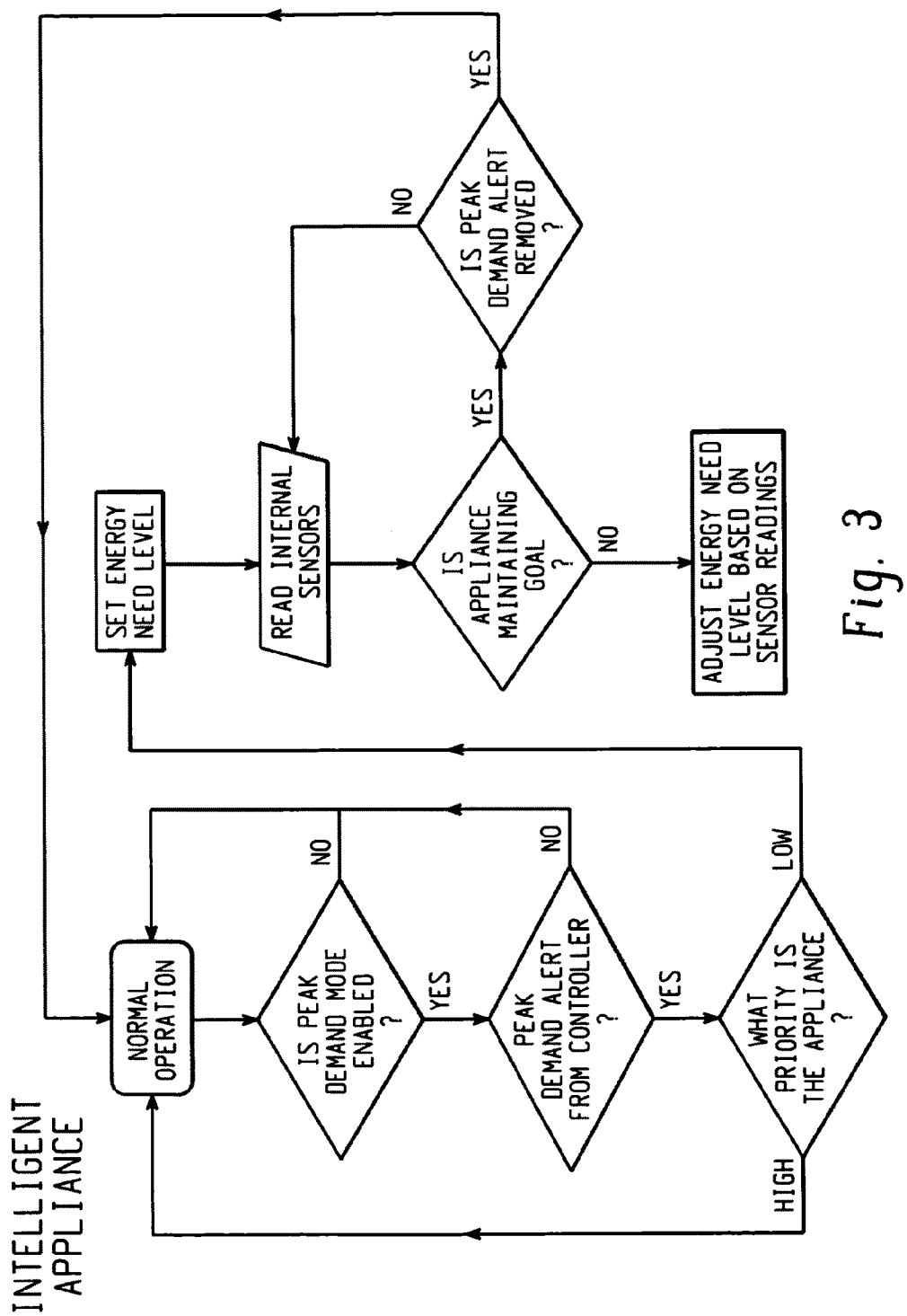

Each intelligent appliance has a communication interface that links itself to the controller (FIG. 3). This interface can be power-line carrier, wireless, and/or wired. The controller will interact with the appliance and lighting controls as well as thermostat (for HVAC) to execute the users preferences/settings.

Enabled appliances receive signals from the utility meter and help lower the peak load on the utility and lower the amount of energy that the consumer uses during high energy cost periods of the day. There are several ways to accomplish this, through wireless communication (ZigBee, WiFi, etc) or through PLC (power line carrier) communication. Alternatively, using passive RFID tags that resonate at different frequencies resonated by the master, or one or more active RFID tags that can store data that can be manipulated by the master device and read by the slave devices(s) is an effective and potentially lower cost communication solution since there is no protocol. Rather, a pulse of energy at a particular frequency will allow a low cost method with an open protocol for transmitting/communicating between a master device and one or more slave devices, and appropriate functions/actions can be taken based upon these signals.

Figure 4:
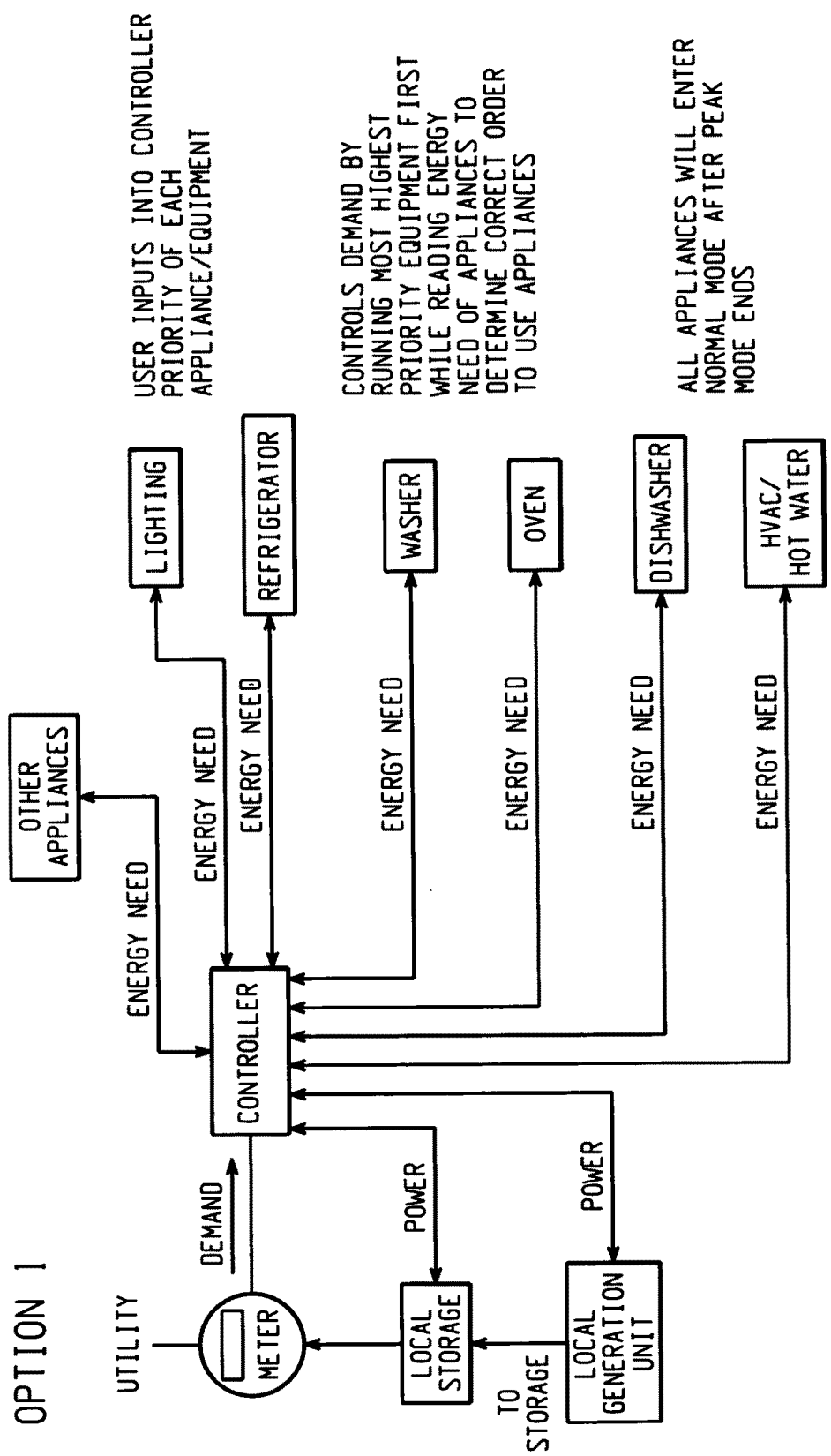

The interaction between controller and appliances can occur in two ways. For example, in one scenario during a peak demand period, the controller will receive a demand limit from the utility, demand server or user. The controller will then allocate the home's demand based on two factors: priority of the appliance and energy need level (FIG. 4). The priority dictates which appliances have higher priority to be in full or partial energy mode than other appliances. Energy need dictates how much energy is required for a certain time period in order for that appliance to function properly. If the appliance's energy need is too low to function properly, the appliance moves to a normal mode or a higher energy need level. The energy saving mode is typically a lower energy usage mode for the appliance such as shutdowns of compressors and motors, delayed cycles, higher operating temperatures in summer or lower operating temperatures in winter until the peak demand period is over. Once the demand limit is reached, the appliances will stay in their energy mode until peak demand is over, or a user overrides, or appliance finishes need cycle or priority changes. The controller constantly receives status updates from the appliances in order to determine which state they are in and in order to determine if priorities need to change to accomplish the system goals.

Figure 5:
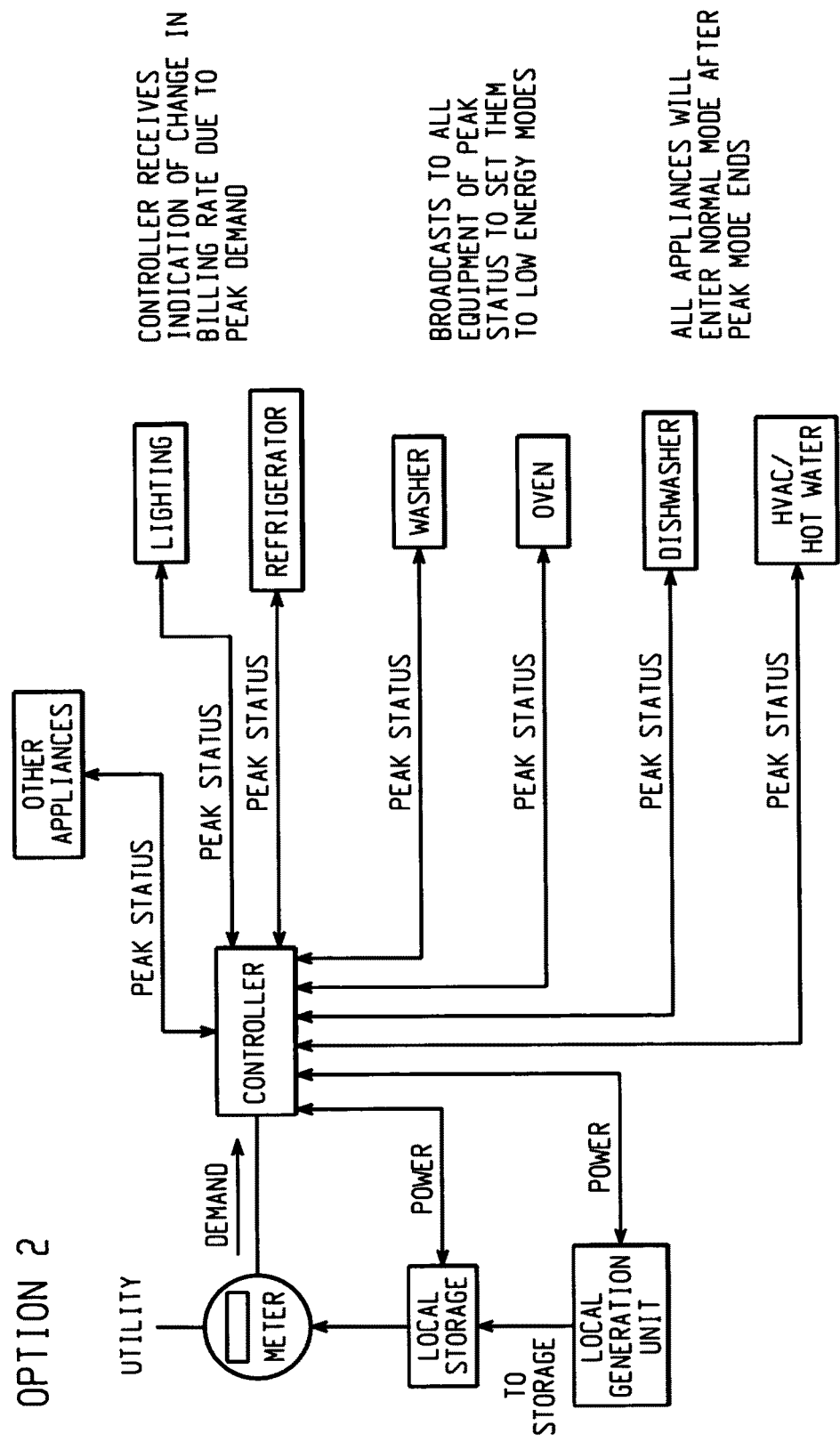

In a second scenario, for example, a set point is provided. During a peak demand period, the controller will tell each appliance to go into peak demand mode (FIG. 5). The appliance will then go into a lower energy mode. The customer can deactivate the energy savings mode by selecting a feature on the appliance front end controls (i.e. user interface board) before or during the appliance use or at the controller. The controller can also communicate to a local storage or power generation unit. This local unit is connected to the incoming power supply from the utility. The controller notifies the storage unit to charge when it is not in peak demand, if a storage unit is included and available. If the storage unit has enough energy to supply the appliances during peak demand, then the controller will switch the home's energy consumption from the utility to the storage unit. The unit can also be local generator/storage such as solar, hydrogen fuel cell, etc.

Figure 6:
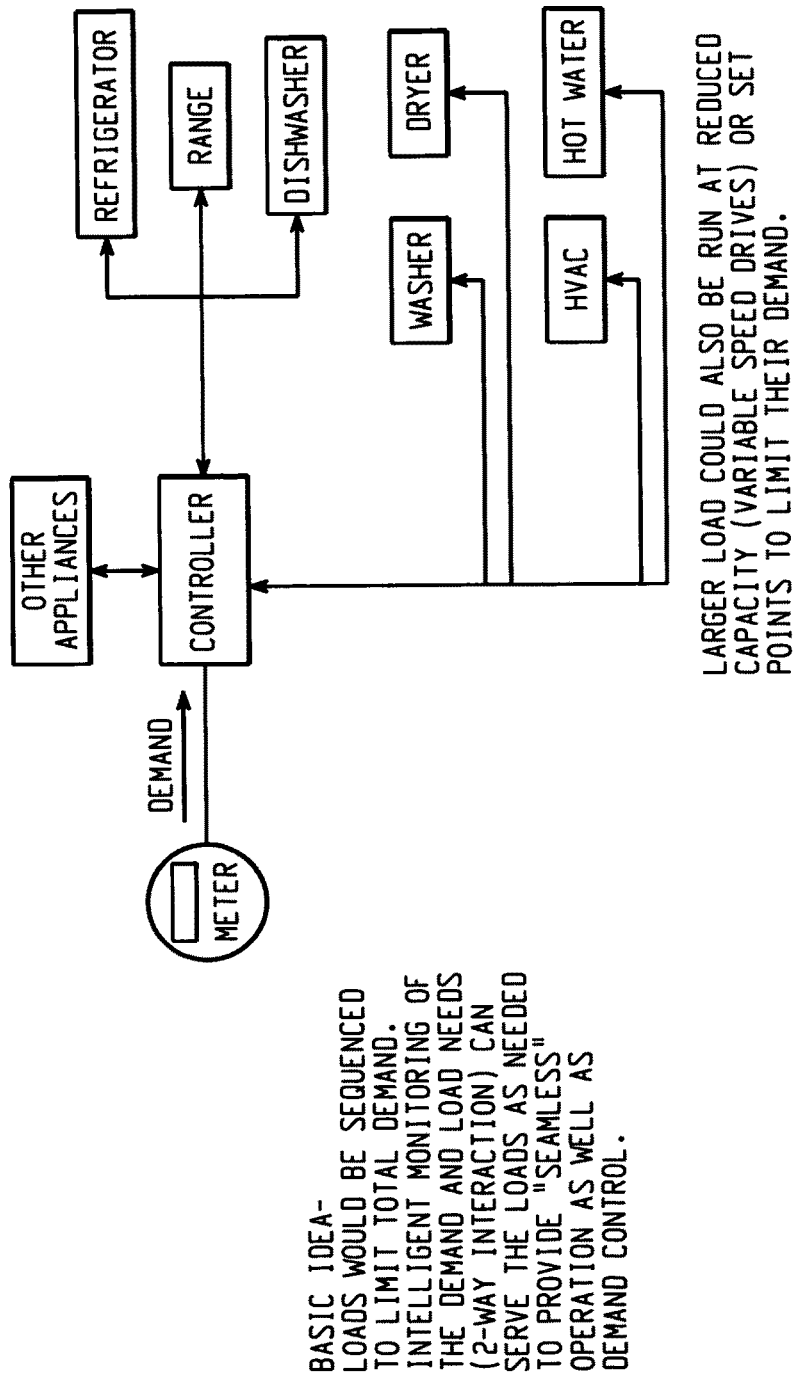
Figure 7:
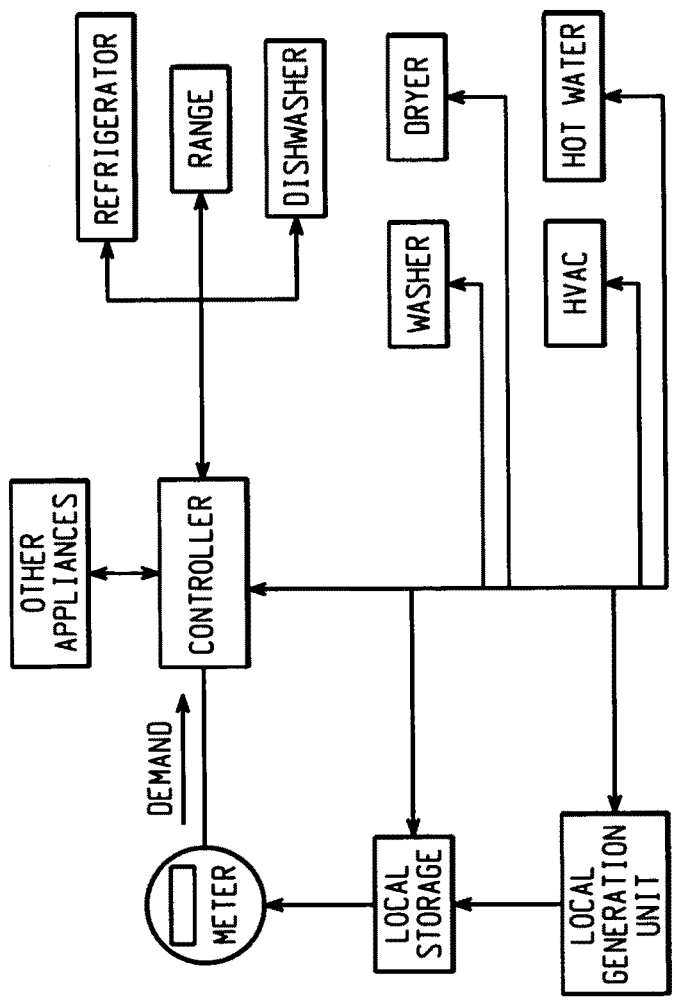
Figure 8:
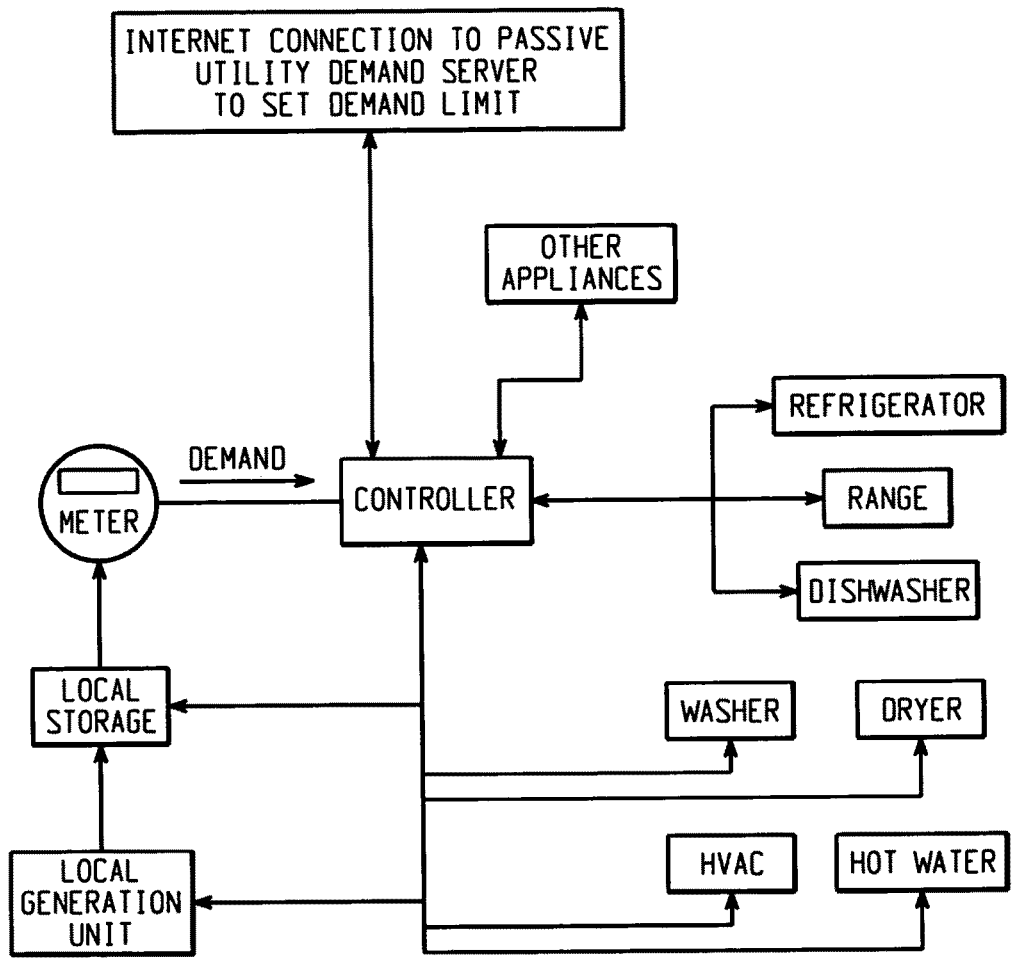

The central controller handles energy management between the utility and home appliances, lighting, thermostat/HVAC, etc. with customer choices incorporated in the decision making process. The controller may include notification of an energy saving mode based on demand limit read from one or more of a utility meter, utility, demand server or user. An energy savings mode of an appliance can thereby be controlled or regulated based on priority and energy need level sent from the controller and/or the customer (FIG. 6). Likewise, consideration to use of local energy storage and use of a local generator to offset peak demand limit can be incorporated into the energy management considerations, or provide the ability to override mode of energy savings through the controller or at the appliance, lighting, or thermostat/HVAC (FIGS. 7 and 8).

The present disclosure has the ability for the home to shed loads in pending brown-out or black-out situations, yet have intelligence to prevent an improper action such as shutting down the refrigerator for extended timeframes that might compromise food storage safety.

How much energy the appliance consumes in peak demand is based on priority of the device and the energy need level. If the appliance's priority is high, then the appliance will most likely not go into a saving mode. The energy need level is based on how little energy the appliance can consume during peak demand and still provide the function setting it is in (i.e. in a refrigerator, ensuring that the temperature is cool enough to prevent spoiling). It will also be appreciated that an appliance may have multiple energy need levels.

The controller will be the main product with the communication and settings control incorporated within future appliances. Specific meters will be selected so that the controller can read the demand usage. It is intended that the demand server will possibly be purchased or leased to the utility.

A method is provided for constructing an appliance designed to perform any key function, the appliance comprises of several mechanical and electrical elements controlled by a main controller. This main controller has a port for receiving information regarding the operational state of the appliance. The port also has a user interface or switch which could be used to override the information received by the controller through the port. Two-way or one-way communication devices may be connected to the port. These communication devices will receive signals from a remote controller, process those signals and as a result communicate an operational state to the main controller of the appliance. This operational state is communicated to the main controller by one or more remote controllers in a specific format determined by the appliance. These signals from the remote controller(s) could be based on a variety of communication methods and associated protocols. On receiving the operational state signal, the appliance main controller causes the appliance to run a predetermined operational mode. These operational modes are designed into the appliance(s) and result in different resource consumption levels or patterns, even delaying use. Resources could include energy, water, air, heat, sunlight, time, etc. In future appliance models, the consumer might be given the authority to modify the appliance responses to a given rate signal. The consumer would be presented a "check box" of potential response modes and allowed to choose within set parameters. For instance, the consumer might be allowed to choose the amount of temperature adjustment a refrigerator will make in response to a high utility rate.

A method of communicating data between a master device and one or more slave devices may advantageously use continuous tone-coded transmission system. This can be a number of states or signals, either using one or more continuous tones that signify different rate states coming from the home area network (from meter) or the utility. Additionally, one could send a combination of tones to transmit binary messages using a few tones. The slave devices will incorporate a receiver that receives the carrier frequency and then decodes the continuous tone which corresponds to the particular state of the utility rate. Once the "receiver board" detects the tone, then the downstream circuitry will trigger the appropriate response in the appliance. The carrier frequency in this scheme can be numerous spectrums, one being the FM broadcast band or a specific FM band allocated by the FCC for low level power output. The advantage of broadcast band FM is the low cost of such devices and the potential to penetrate walls, etc. within a home with very low levels of power due to the long wavelength of the 89-106 Mhz carrier. This process is used today in 2-way radio communications to reduce the annoyance of listening to multiple users on shared 2-way radio frequencies. The process in these radios is referred to as CTCSS (continuous tone-coded squelch system) and would find application in this end use.

Generally, it is not known to have modular interfaces that can receive signals from a control source. Also, no prior arrangements have functioned by addressing the control board of the appliance with a signal that directs the appliance to respond.

Thus, by way of example only, the structure and/or operation of a refrigerator (FIG. 9, although other appliances are also represented) may be modified or altered by reducing the temperature, especially in the freezer compartment pre on-peak time and further temporarily provide a compartment temperature increase to shave on-peak load. Specifically, defrost operation could be delayed until off-peak time. Alternatively or conjunctively, the freezer and refrigerator temperature setpoints may be set to maintain less compressor on time during on-peak demand times. Similarly, the refrigerator/freezer could be programmed so that lights will not be permitted to come on or the lights must be dimmed lights during on-peak demand times. During on-peak demand times, the fan operating speeds can be reduced, and/or compressor operating speed reduced in order to reduce energy consumption. Still another option is to reduce the delay time for the door alarm to sound during on-peak time. Other power load reducing measures in a refrigerator may include (reducing before on-peak hours) the temperature of the freezer and refrigerator compartments in a refrigerator (prechill) and slightly increase temperature setting during on-peak rates. For example, just before peak rate time, the temperature setting could be decreased by 1-2 degrees (during off-peak rates). Some communication line with the electrical company could be established. Thus, the electrical company may be able to send a signal in advance to prechill the refrigerator (or in the case of an air conditioner, decrease the room temperature during off-peak rates as a pre-chill maneuver) and, in turn, increase the temperature setting during on-peak rates.

Figure 12:
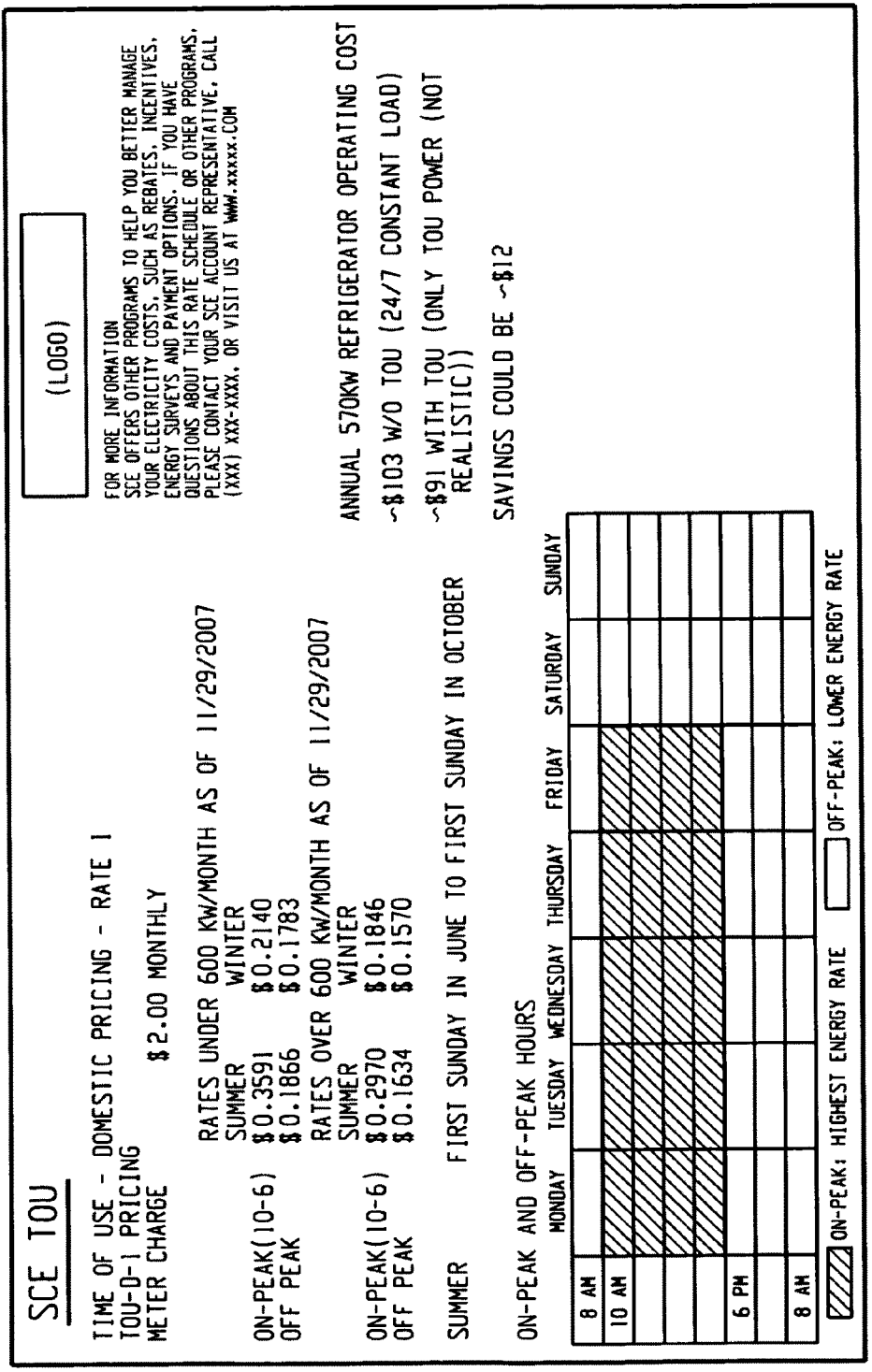
Figure 14:
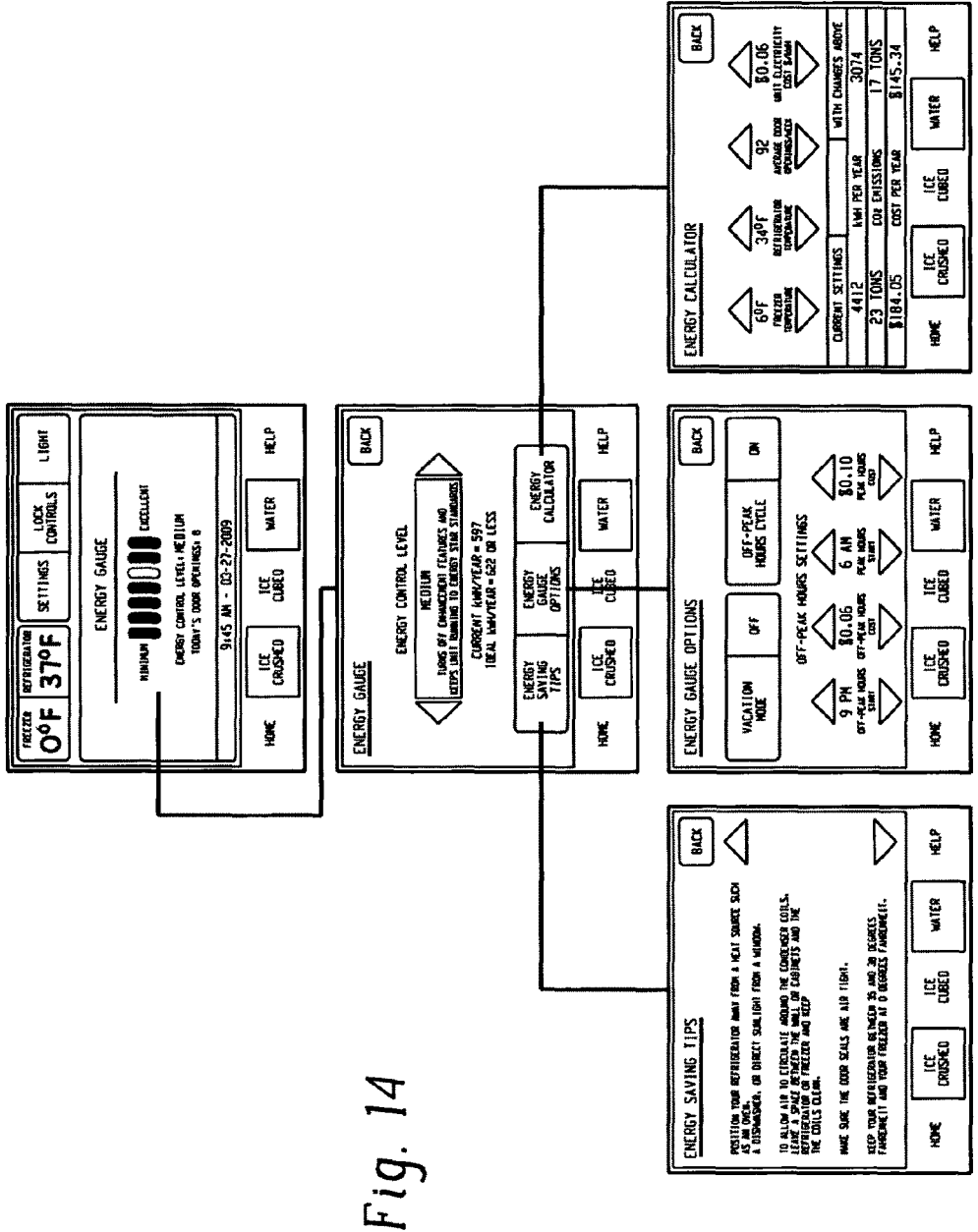
Figure 15:
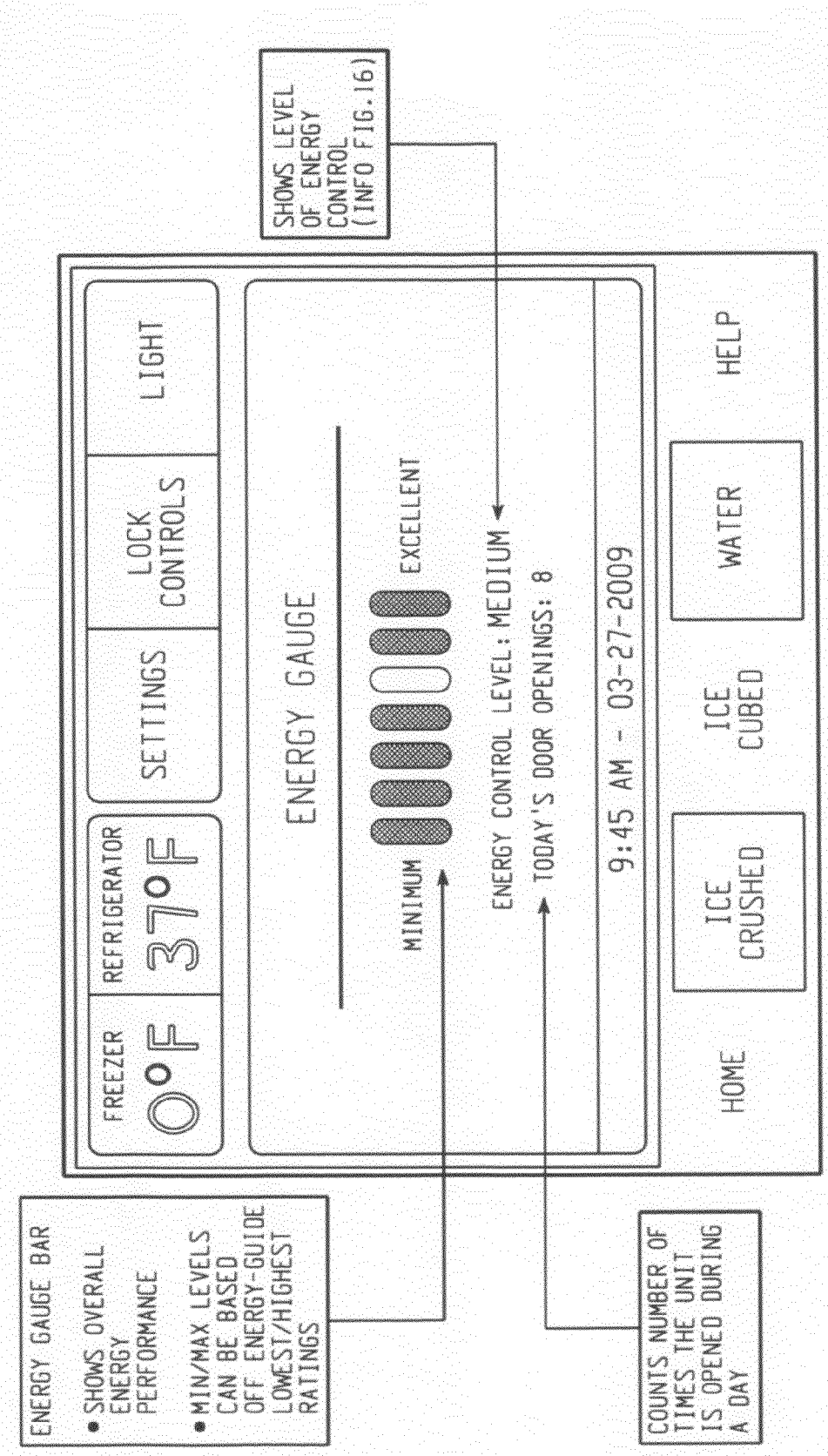
Figure 16:
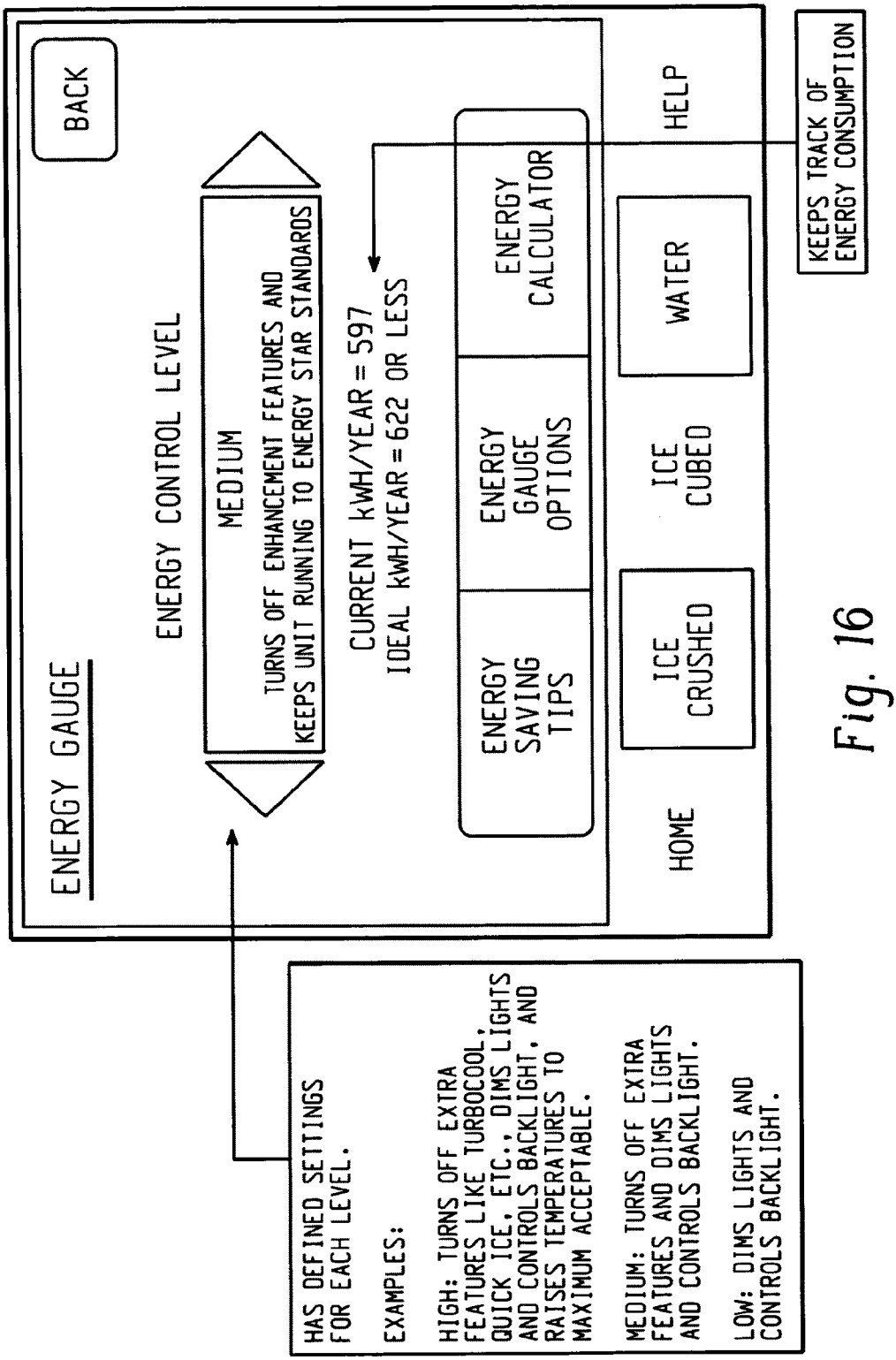
Figure 17:
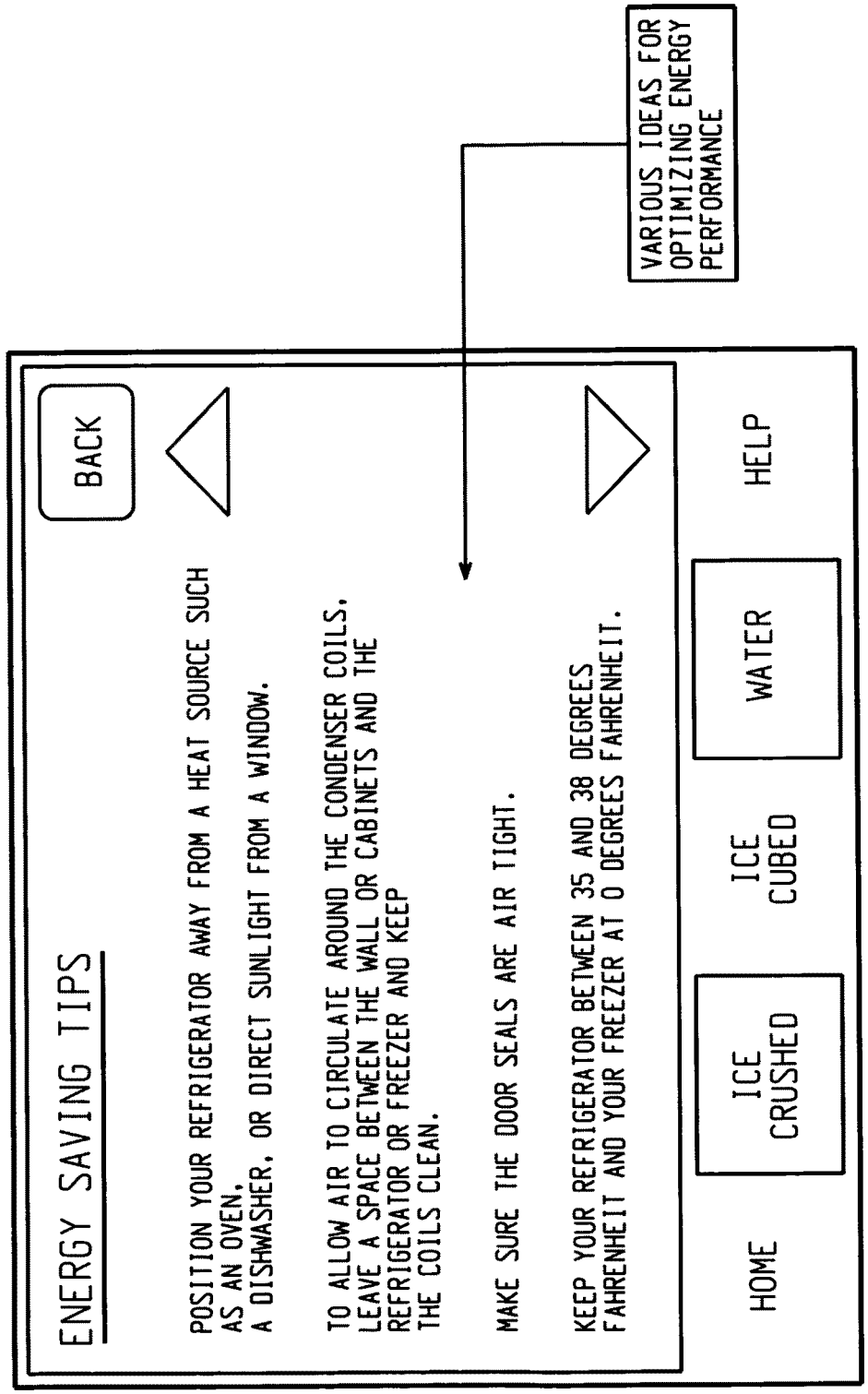
Figure 18:
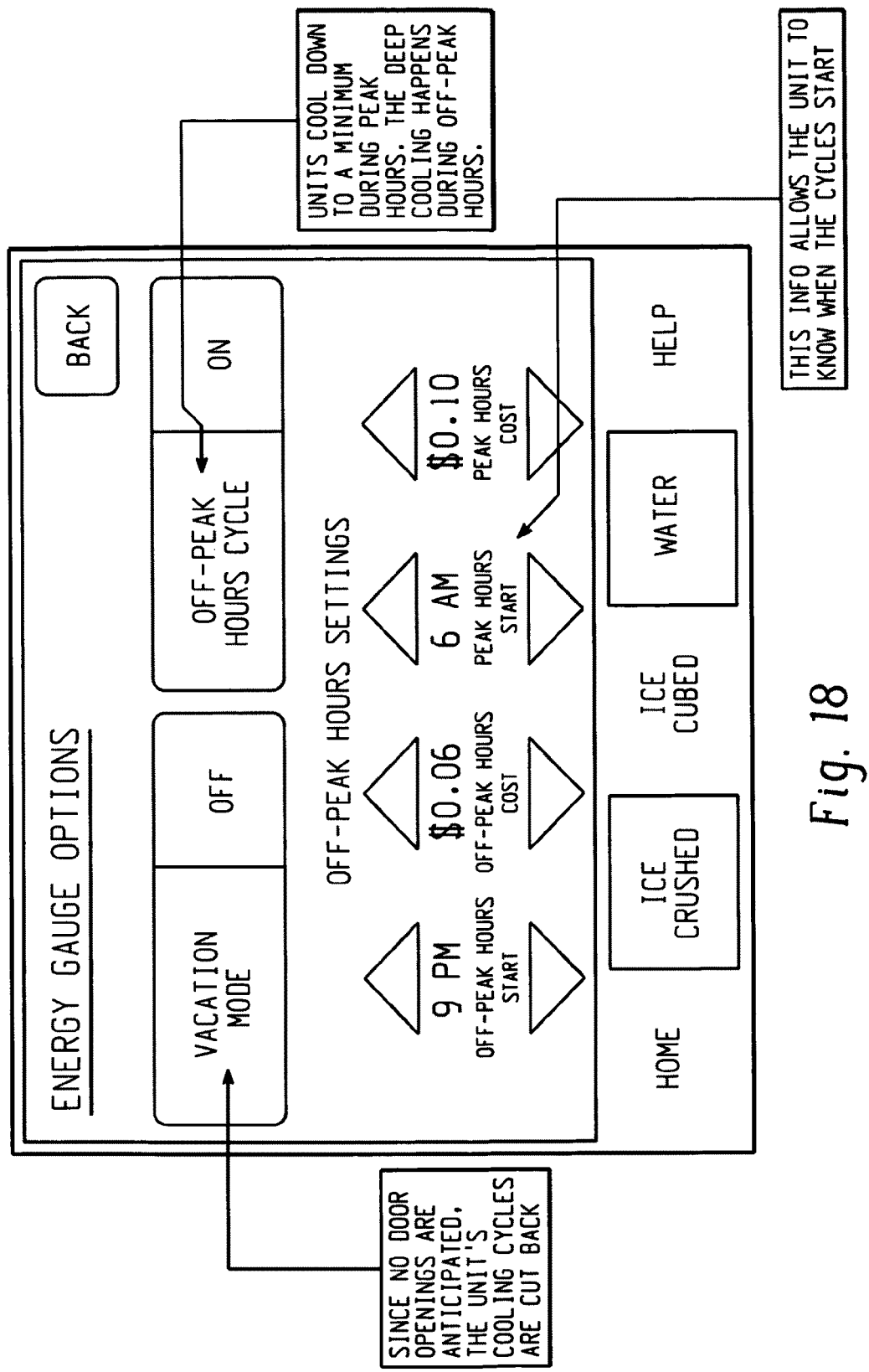
Figure 19:
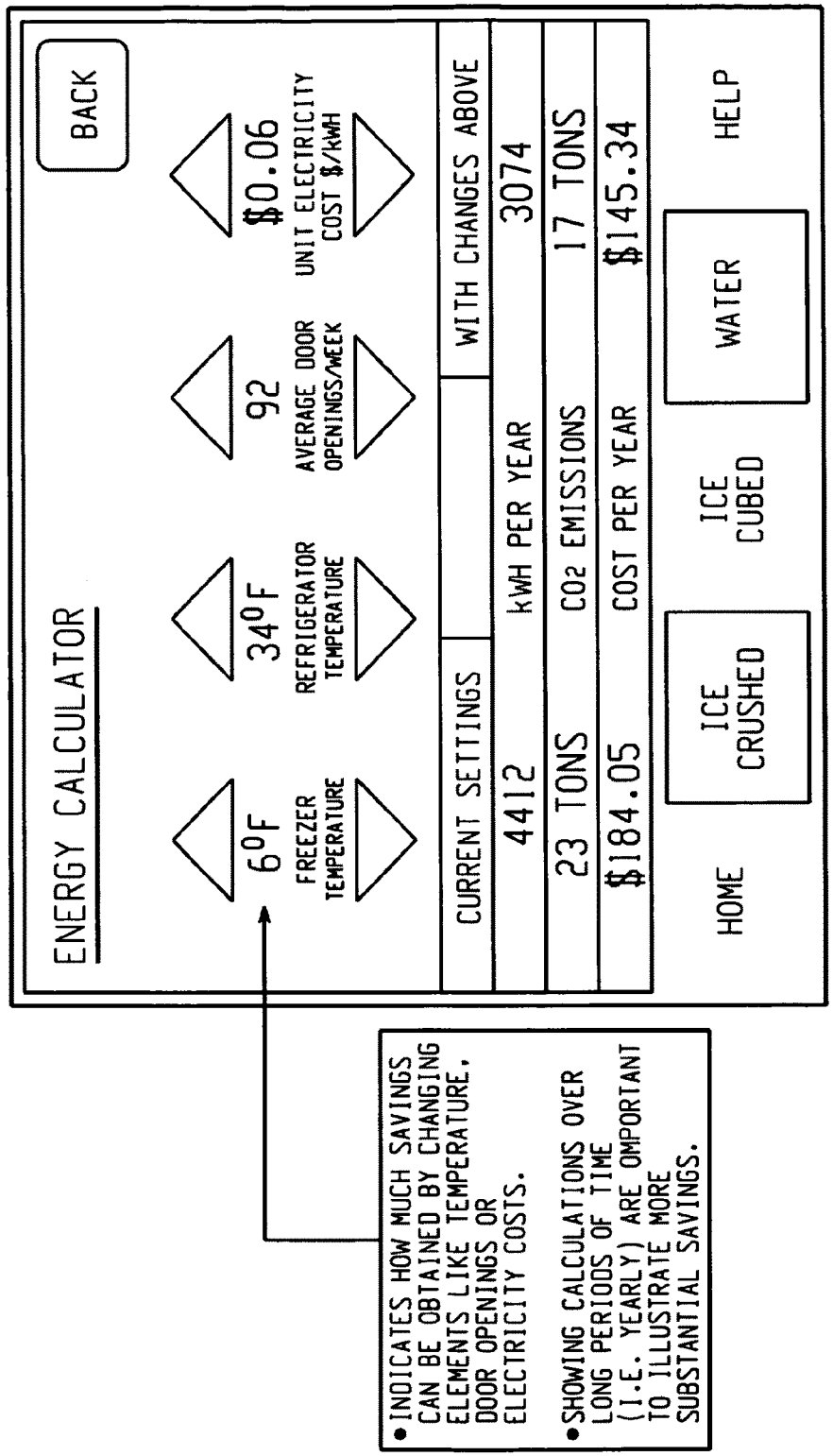

Still other energy consuming practices of the exemplary refrigerator that may be altered include turning the ice-maker off during on-peak demand times, or disabling the crushed ice mode during on-peak demand times. Alternatively, the consumer may be given the ability to select via a user interface which items are incorporated into the on-peak demand via an enable/disable menu, or to provide input selection such as entry of a zip code (FIG. 10) in order to select the utility company and time of use schedule (FIG. 11), or using a time versus day of the week schedule input method (FIGS. 12-13).

The user interface may also incorporate suggested energy saving tips or show energy usage, or provide an indicator during on-peak mode, or provide a counter to illustrate the energy impact of door opening, or showing an energy calculator to the consumer to serve as a reminder of the impact of certain selections/actions on energy use or energy conservation (FIGS. 14-19).

One path that is being pursued from the appliance perspective is to allow the onboard CPU (microprocessor) of the appliance to determine how to respond to an incoming signal asking for a load shedding response. For example, the CPU will turn on, turn off, throttle, delay, adjust, or modify specific functions and features in the appliance to provide a turndown in power consumption (FIG. 20). FIG. 21 defines specifically exemplary modes of what are possible. The main feature here is the enabling of the main board microprocessor or CPU to execute actions in the appliance to deliver load shedding (lowering power consumption at that instant). The actions available in each appliance are only limited to the devices that the CPU has control over, which are nearly all of the electrical consuming devices in an appliance. This may work better where the appliance has an electronic control versus an electromechanical control.

Of course, the above description focuses on the refrigerator but these concepts are equally applicable to other home appliances such as dishwashers, water heaters, washing machines, clothes dryers, televisions (activate a recording feature rather than turning on the television), etc., and the list is simply representative and not intended to be all encompassing.

Likewise, although these concepts have been described with respect to appliances, they may find application in areas other than appliances and other than electricity usage. For example, a controller that acts as an intermediary between the utilities meter and the appliance interprets the utility signal, processes it and then submits this signal to the appliance for the prescribed reaction. In a similar fashion, the controller may find application to other household utilities, for example, natural gas and water within the home. One can equip the water and gas meters to measure flow rates and then drive responses to a gas water heater or gas furnace precisely like the electrical case. This would assume that one might experience variable gas and water rates in the future. Secondly, the flow meters being connected to the controller could provide a consumer with a warning as to broken or leaking water lines by comparing the flow rate when a given appliance or appliances are on to the normal consumption. In cases where safety is a concern, the system could stop the flow of gas or water based on the data analysis.

Another feature might be the incorporation of "remote subscription" for the utility benefit. In some cases, the utility will be providing customers discounts/rebates for subscribing to DSM in their appliances, hot water heaters, etc. The "remote subscription" feature would allow the utility to send a signal that would "lockout" the consumer from disabling the feature since they were on the "rebate" program.

Another feature that the controller lends itself to is the inclusion of "Remote diagnostics". This feature would allow the appliance to send a signal or message to the controller indicating that something in the appliance was not up to specifications. The controller could then relay this signal to the utility or to the appliance manufacturer via the various communication avenues included into the controller (i.e., WIFI, WIMAX, Broadband, cell phone, or any other formats that the controller could "speak").

In the case of a remote subscription, the utilities today rely on the honesty of their subscribers to leave the DSM system functional. Some people may receive the discounts/rebate and then disable the feature that drives the load shedding. With this system, the utility can ensure that the feature will be enabled and provide the proper load shedding.

Figure 22:
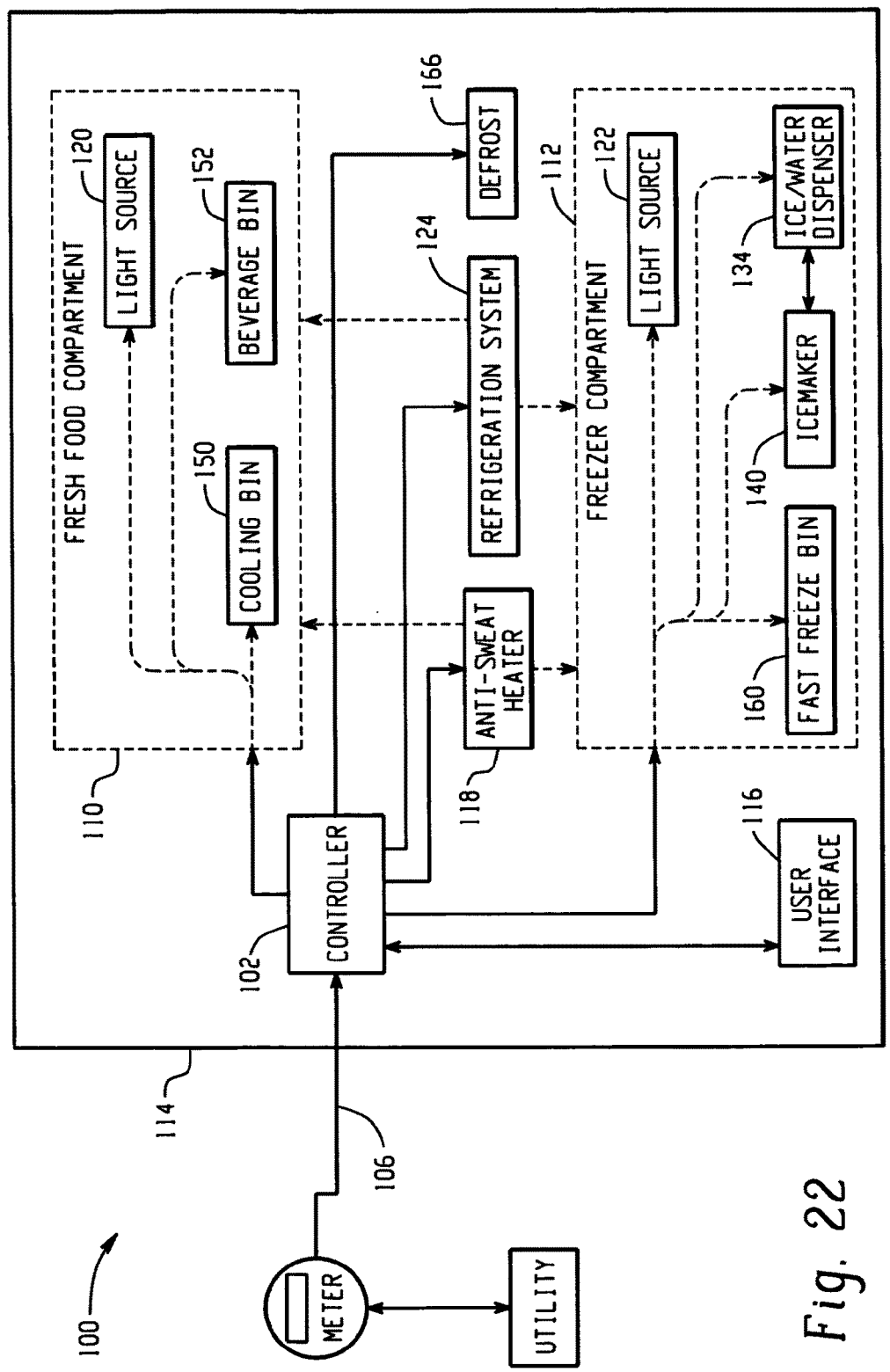
FIG. 22 is a schematic illustration of an exemplary demand managed refrigerator.

An exemplary embodiment of a demand managed refrigerator 100 is schematically illustrated in FIG. 22. The refrigerator 100 comprises one or more power consuming features/functions and a controller 102 operatively connected to each of the power consuming features/functions. The controller 102 can include a micro computer on a printed circuit board which is programmed to selectively control the energization of the power consuming features/functions. The controller 102 is configured to receive and process a signal 106 indicative of a utility state, for example, availability and/or current cost of supplied energy. The energy signal may be generated by a utility provider, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relative low price or cost is typically associated with an off-peak demand state or period.

The controller 102 can operate the refrigerator 100 in one of a plurality of operating modes, including at least a normal operating mode and an energy savings mode, in response to the received signal. Specifically, the refrigerator 100 can be operated in the normal mode in response to a signal indicating an off-peak demand state or period and can be operated in an energy savings mode in response to a signal indicating a peak demand state or period. As will be discussed in greater detail below, the controller 102 is configured to at least one of selectively delay, adjust and disable at least one of the one or more power consuming features/functions to reduce power consumption of the cooking appliance 100 in the energy savings mode.

The refrigerator can be in the form of a "side-by-side" refrigerator which has a fresh food compartment 110 located to the side of a freezer compartment 112. Alternatively, the refrigerator can be in the form of "bottom freezer" or "bottom mount freezer" refrigerator which has the fresh food compartment 110 located above the freezer compartment 112. The present invention is therefore not intended to be limited to any particular type or configuration of a refrigerator.

The fresh food compartment 110 and freezer compartment 112 are contained within an outer case or cabinet 114. Each of these compartments has its own door mounted on hinges secured to the cabinet, and has a magnetic sealing gasket around its periphery that engages with a smooth magnetic surface around each of the associated food compartments opened and closed by the door. A control panel or user interface 116 is provided on one of the doors and is operatively connected to the controller 102. The control panel 116 can include a display and control buttons for making various operational selections. At least one electrically driven anti-sweat heater 118 is provided for preventing exterior condensation. Light sources 120, 122 illuminate the respective fresh food and freezer compartments 110, 112. Generally, the refrigerator 100 includes a refrigeration system 124 which cools the fresh food compartment 110 and the freezer compartment 112 to respective targeted setpoint temperatures. Normally, the fresh food compartment has a setpoint temperature of about 37° F. and the freezer compartment has a setpoint temperature of about 0° F.

Figure 23:
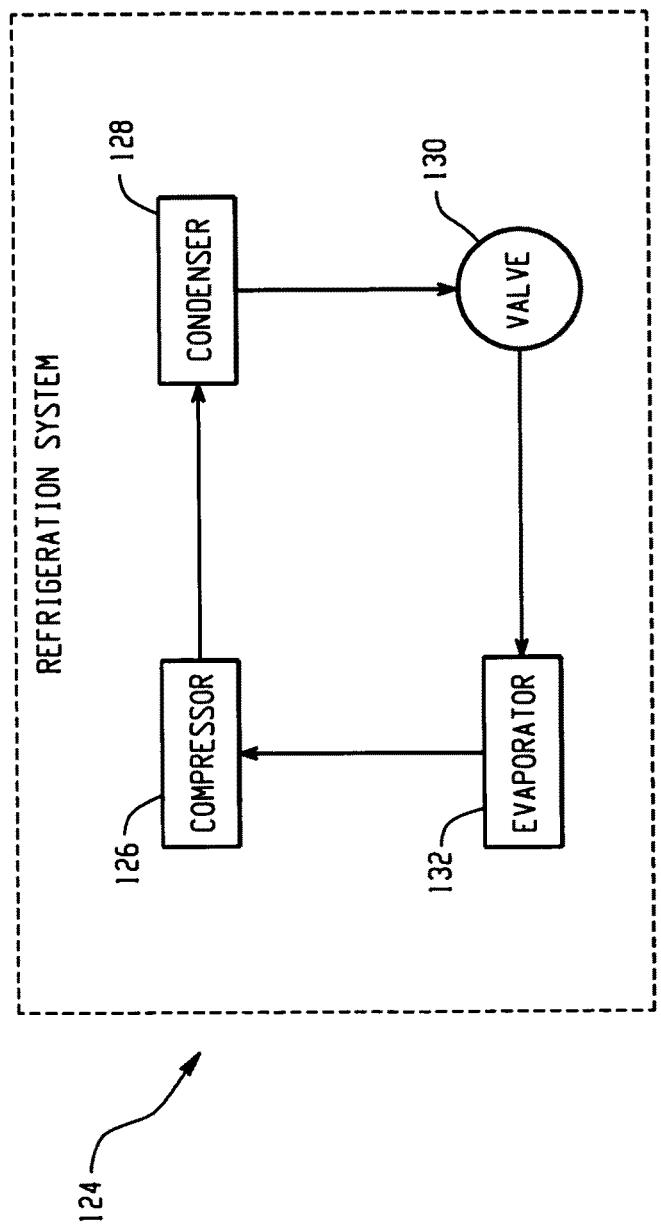
FIG. 23 is a schematic illustration of a refrigeration system for the refrigerator of FIG. 22.

In accordance with known refrigerators, the refrigeration system 124 at least partially contains components for executing a known vapor compression cycle for cooling air in the fresh food and freezer compartments 110, 112. In the illustrative embodiment of FIG. 23, the refrigeration system 124 include a compressor 126, a condenser 128, an expansion device 130, and an evaporator 132 connected in series and charged with a refrigerant. The evaporator is a type of heat exchanger that transfers heat from air passing over the evaporator to a refrigerant flowing through the evaporator, thereby causing the refrigerant to vaporize. The cooled air is used to refrigerate one or more fresh food or freezer compartments, such as the fresh food and freezer compartments 110, 112, via fans (not shown). Collectively, the vapor compression cycle components in the refrigeration circuit, associated fans, and associated compartments are referred to herein as the refrigeration system 124. The construction of the refrigeration system 124 is well known and therefore not described in detail herein, and the sealed system is operable to force cold air through the refrigerator 100.

With continued reference to FIG. 22, the door of the freezer compartment 112 is configured with a dispenser 134 for through the door ice service. It should be appreciated that the dispenser 134 can be located on the door of the fresh food compartment 110. The dispenser can also contain a beverage service, such as for hot or cold water. An ice making and storage compartment (not shown) is mounted on the inside of the freezer compartment door. The ice making and storage compartment has an icemaker 140 and an ice bucket, and may also have an ice chute for through the door beverage and ice service at the dispenser 134. Supplying ice through the door of a refrigerator is known and will not be described in detail. It can be appreciated that the means for cooling the ice making and storage compartment may be any known means. Further, in this exemplary embodiment the icemaker 140 has a quick ice feature for quickly producing ice.

The fresh food compartment 110 can further include at least one of a cooling bin 150 and a beverage bin 152 located therein. The cooling bin 150 has a fast cool feature for quickly cooling a consumer product located in the cooling bin to a predetermined temperature. The beverage bin 152 has a beverage cool feature for maintaining the beverage bin at a predetermined temperature generally lower than a setpoint temperature of the fresh food compartment 110. The freezer compartment 112 can further include a fast freeze bin 160 located therein. The fast freeze bin has a fast freeze feature for fast freezing a consumer product located in the fast freeze bin.

An automatic defrost 166 is also provided for the refrigerator 100 for defrosting the evaporator. As is well know, the defrost cycle generally has a scheduled activation time which can be based on an algorithm set forth in the controller to initiate the defrost cycle. Generally, the algorithm can be based on different variables. For example, the algorithm can include a counter and at a set number of counts, the defrost cycle is initiated. The counts, for example, can be associated with one or more of the following illustrative operating parameters, time since last defrost cycle, compressor on time, and the number of openings of each of the compartment doors. The scheduled activation time can also be based on a user selected time and/or a specified calendar time.

If the controller 102 receives and processes an energy signal indicative of a peak demand period at any time during operation of the refrigerator 100, the controller makes a determination of whether one or more of the power consuming features/functions should be operated in the energy savings mode and if so, it signals the appropriate features/functions of the refrigerator 100 to begin operating in the energy savings mode in order to reduce the instantaneous amount of energy being consumed by the refrigerator. The controller 102 determines what features/functions should be operated at a lower consumption level and what that lower consumption level should be, rather than an uncontrolled immediate termination of the operation of specific features/functions.

In order to reduce the peak energy consumed by the refrigerator 100, the controller 102 is configured to at least one of selectively delay, adjust and disable at least one of the one or more above described power consuming features/functions to reduce power consumption of the refrigerator 100 in the energy savings mode. Reducing total energy consumed also encompasses reducing the energy consumed at peak times and/or reducing the overall electricity demands. Electricity demands can be defined as average watts over a short period of time, typically 5-60 minutes. Off peak demand periods correspond to periods during which lower cost energy is being supplied by the utility relative to peak demand periods. Operational adjustments that result in functional energy savings will be described in detail hereinafter.

As set forth above, both the fresh food compartment and the freezer compartment have a setpoint temperature in the normal operating mode. To reduce the power consumption of the refrigerator 100 in the energy savings mode, the controller 102 is configured to increase the setpoint temperature of the freezer compartment 112 to precipitate less compressor on time in the energy savings mode. For example, the controller can increase the setpoint temperature or the freezer compartment from 0° F. to about 6° F. The controller 102 can also increase the setpoint temperature of the fresh food compartment 110 in the energy savings mode. For example, the controller can increase the setpoint temperature or the fresh food compartment from 37° F. to about 43° F. To precipitate less compressor on time, according to one aspect, a duty cycle of the compressor 126 can be adjusted in the energy savings mode. For example, the compressor can turn off until the increased setpoint temperature is reached and then turn one with the same duty cycle or a different duty cycle. According to another aspect, to reduce the current draw of the compressor 126 in the energy savings mode, the refrigeration capacity of the compressor can be adjusted, for example, by reducing speed of the compressor and/or capacity of the compressor (for example, a variable displacement/stroke compressor). According to yet another aspect, the refrigeration system 124 can be temporarily deactivated in the energy savings mode.

To further reduce the power consumption of the refrigerator, the controller 102 is configured to selectively deactivate at least one of the fast cool feature, beverage cool feature and the fast freeze feature in the energy savings mode. In one exemplary embodiment, each of the fast cool feature, beverage cool feature and the fast freeze feature is deactivated in the energy savings mode. The voltage to the anti-sweat heater 118 can be reduced or the anti-sweat heater can be deactivated or duty cycled in the energy savings mode. The controller 102 can also selectively deactivate one of the dispenser 134 and the icemaker 140 in the energy savings mode. If the icemaker 140 includes a quick ice feature, the controller 102 can deactivate the one of the icemaker and quick ice feature in the energy savings mode. The light sources 120, 122 of the fresh food and freezer compartments 110, 112 can also be deactivated or dimmed in the energy savings mode.

As indicated previously, the automatic defrost cycle 166 has a scheduled activation time. If the scheduled activation time occurs while operating in the energy savings mode, the controller 102 is configured to delay the defrost cycle until return to the normal operating mode unless performance degradation of the refrigerator 100 is detected. If the defrost cycle is to be activated in the energy savings mode, power to the defrost heaters can be reduced thereby lessening the impact on the power consumed, but resulting in a longer time to complete the defrost cycle. In the normal operating mode, the controller 102 is configured to initiate the defrost cycle even if the controller is not yet "calling for" a defrost based on the algorithm set forth in the controller to initiate the defrost cycle if the controller determines that the scheduled activation time will occur in the energy savings mode. Particularly, the associated utility typically sends advance notice of its utility state including the peak-demand period. The controller receives and processes this advance notice thereby allowing the controller to adjust the defrost cycle based on an upcoming utility state. The defrost cycle can be time shifted so that the defrost cycle can be completed prior to the upcoming peak-demand period. To further reduce current draw, multiple defrost methods (i.e., conductive, radiant) can be used.

The determination of which power consuming features/functions are operated in a energy savings mode may depend on whether the refrigerator 100 is currently operating. In one embodiment, the controller 102 includes functionality to determine whether activation of the energy savings mode for any power consuming features/functions would potentially cause damage to any feature/function of the refrigerator 100 itself or would cause the refrigerator to fail to perform its intended function. If the controller determines that an unacceptable consequence may occur by performing an energy saving action, such as deactivating or curtailing the operation of a power consuming feature/function in the refrigerator 100, the controller may opt-out of performing that specific energy saving action or may institute or extend other procedures. As a result, the controller prevents the refrigerator or its contents from being damaged. For example, according to one aspect, the controller 102 determines that deactivation or limitation of the operation of the compressor 126 may prevent the refrigerator 100 from achieving a setpoint temperature that can adequately refrigerate food. Accordingly, the controller will not deactivate or limit the operation of the compressor 126 in the energy savings mode. According to another aspect, the refrigerator further includes at least one sensing device 170 operatively connected to the controller 102 for measuring temperature of each of the fresh food compartment and the freezer compartment 110, 112. In the energy savings mode if the measured temperature of one of the fresh food and freezer compartments 110, 112 exceeds its respective increased setpoint temperature, the controller 102 is configured to one of adjust the duty cycle of the compressor 126 to precipitate more compressor on time, increase the speed of the compressor 126 and increase the capacity of the compressor 126 until the measured temperature of the compartment no longer exceeds its increased setpoint temperature. According to another aspect, occupancy sensors can be provided on the refrigerator. The occupancy sensors are in communication with the controller 102 so that the controller can automatically adjust operation of the refrigerator based on activity as detected by the sensors. For example, the sensors can have preprogrammed algorithms to detect presence of the homeowner. If the sensors do no detect the homeowner, the controller can operate in the energy savings mode regardless of the energy state.

Figure 24:
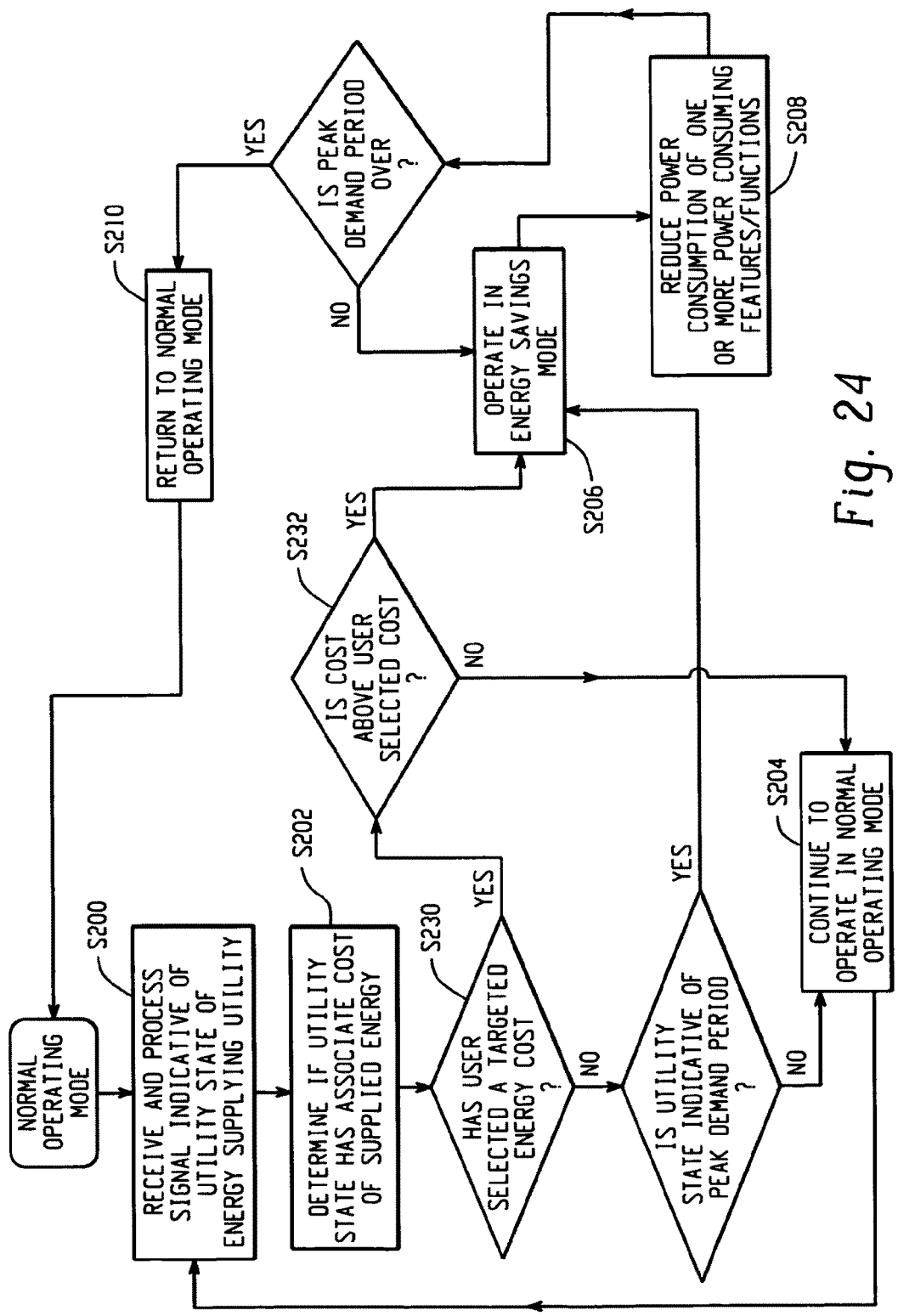
FIGS. 24 and 25 are exemplary operational flow charts for the refrigerator of FIG. 22.

With reference to FIG. 24, a refrigerator control method in accordance with the present disclosure comprises receiving and processing the signal indicative of cost of supplied energy (S200), determining a state for an associated energy supplying utility, such as a cost of supplying energy from the associated utility (S202), the utility state being indicative of at least a peak demand period or an off-peak demand period, operating the refrigerator 100 in a normal mode during the off-peak demand period (S204), operating the refrigerator in an energy savings during the peak demand period (S206), scheduling, delaying, adjusting and/or selectively deactivating any number of one or more power consuming features/functions of the refrigerator 100 to reduce power consumption of the refrigerator in the energy savings mode (S208), and returning to the normal mode after the peak demand period is over (S210).

Figure 25:
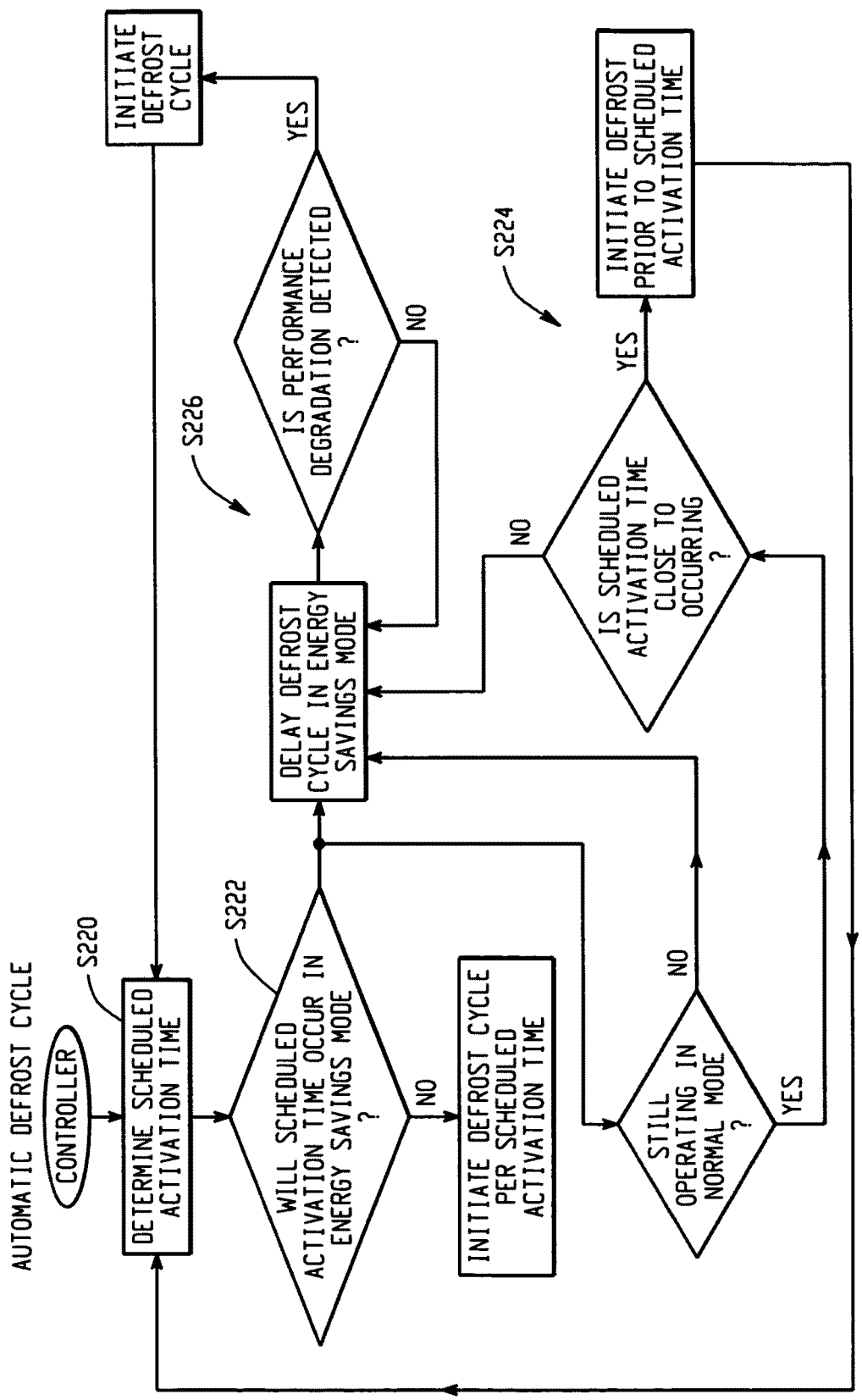

With reference to FIG. 25, the control method further comprises determining the scheduled on-time of the defrost cycle (S220), determining if the scheduled on-time will occur in the energy savings mode (S222), activating the defrost cycle prior to the scheduled on-time while still operating in the normal mode if close to the scheduled on-time (S224), and/or delaying a scheduled on-time of the defrost cycle while operating in the energy savings mode unless performance degradation of the refrigerator is detected (S226).

As indicated previously, the control panel or user interface 116 can include a display and control buttons for making various operational selections. The display can be configured to communicate active, real-time feedback to the user on the cost of operating the refrigerator 100. The costs associated with using the refrigerator 100 are generally based on the current operating and usage patterns and energy consumption costs, such as the cost per kilowatt hour charged by the corresponding utility. The controller 102 is configured to gather information and data related to current usage patterns and as well as current power costs. This information can be used to determine current energy usage and cost associated with using the refrigerator 100 in one of the energy savings mode and normal mode. This real-time information (i.e., current usage patterns, current power cost and current energy usage/cost) can be presented to the user via the display.

It is to be appreciated that a manual or selectable override can be provided on the user interface 116 providing a user the ability to select which of the one or more power consuming features/functions are delayed, adjusted and/or disabled by the controller in the energy savings mode. The user can override any adjustments, whether time related or function related, to any of the power consuming functions. Further, the user can override the current operating mode of the refrigerator 100. Particularly, as shown in FIG. 24, if the utility state has an associated energy cost, the user can base operation of the refrigerator on a user selected targeted energy cost, such as a selected pricing tier or cost per kilowatt hour charged by the corresponding utility (S230). If the current cost exceeds the selected cost, the controller 102 will operate the refrigerator 100 in the energy savings mode (S232). If the current cost is less than the selected cost, the controller 102 will operate the refrigerator 100 in the normal mode. This operation based on a user selected cost is regardless of the current energy cost being indicative of one of a peak demand period and an off-peak demand period.

The operational adjustments, particularly an energy savings operation can be accompanied by a display on the control panel which communicates activation of the energy savings mode. The energy savings mode display can include a display of "ECO", "Eco", "EP", "ER", "CP", "CPP", "DR", or "PP" on the appliance display panel in cases where the display is limited to three characters. In cases with displays having additional characters available, messaging can be enhanced accordingly. Additionally, an audible signal can be provided to alert the user of the refrigerator operating in the energy savings mode.

The duration of time that the refrigerator 100 operates in the energy savings mode may be determined by information in the energy signal. For example, the energy signal may inform the refrigerator 100 to operate in the energy savings mode for a few minutes or for one hour, at which time the refrigerator returns to normal operation. Alternatively, the energy signal may be continuously transmitted by the utility provider, or other signal generating system, as long as it is determined that instantaneous load reduction is necessary. Once transmission of the signal has ceased, the refrigerator 100 returns to normal operating mode. In yet another embodiment, an energy signal may be transmitted to the refrigerator to signal the refrigerator to operate in the energy savings mode. A normal operation signal may then be later transmitted to the refrigerator to signal the refrigerator to return to the normal operating mode.

The operation of the refrigerator 100 may vary as a function of a characteristic of the utility state and/or supplied energy, e.g., availability and/or price. Because some energy suppliers offer what is known as time-of-day pricing in their tariffs, price points could be tied directly to the tariff structure for the energy supplier. If real time pricing is offered by the energy supplier serving the site, this variance could be utilized to generate savings and reduce chain demand. Another load management program offered by energy supplier utilizes price tiers which the utility manages dynamically to reflect the total cost of energy delivery to its customers. These tiers provide the customer a relative indicator of the price of energy and are usually defined as being LOW, MEDIUM, HIGH and CRITICAL. These tiers are shown in the chart of FIG. 26 to partially illustrate operation of the refrigerator 100 in each pricing tier. The controller is configured to operate the refrigerator in an operating mode corresponding to one of the price tiers. In the depicted exemplary embodiment, the controller 102 is configured to operate the refrigerator 100 in the normal operating mode during each of the LOW and MEDIUM tier and is configured to operate the refrigerator in the energy savings mode during each of the HIGH and CRITICAL tier. However, it will be appreciated that the controller could be configured to implement a unique operating mode for each tier which provides a desired balance between compromised performance and cost savings/energy savings. If the utility offers more than two rate/cost conditions, different combinations of energy saving control steps may be programmed to provide satisfactory cost savings/performance tradeoff.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A refrigerator comprising:
a fresh food compartment;
a freezer compartment;
one or more power consuming devices including a refrigeration system for cooling the fresh food compartment and the freezer compartment, the refrigeration system including a compressor; and
a controller operatively connected to the one or more power consuming devices, the controller being configured to receive and process a signal indicative of a current state of an associated energy supplying utility, the controller operating the refrigerator in one of plurality of operating modes, including at least a normal operating mode and an energy saving mode, in response to the received signal, the controller being configured to at least one of selectively schedule, delay, adjust and deactivate at least one of the one or more power consuming devices to reduce power consumption of the refrigerator in the energy savings mode,
wherein the refrigeration system being configured to cool the freezer compartment to a targeted setpoint temperature of the freezer compartment, and the controller is further configured to increase the targeted setpoint temperature of the freezer compartment to precipitate less compressor on time in the energy savings mode.

2. The refrigerator of claim 1, wherein the refrigeration system is adapted to cool the fresh food compartment to a targeted setpoint temperature of the fresh food compartment, and the controller is further configured to increase the targeted setpoint temperature of the fresh food compartment to precipitate less compressor on time in the energy savings mode.

3. The refrigerator of claim 1, wherein the one or more power consuming devices further includes at least one of:
a cooling bin located in the fresh food compartment and having a fast cool feature for quickly cooling a consumer product located in the cooling bin to a predetermined temperature,
a beverage bin located in the fresh food compartment and having, a beverage cool feature for maintaining the beverage bin at a predetermined temperature generally lower than a setpoint temperature of the fresh food compartment, and
a fast freeze bin located in the freezer compartment and having a fast freeze feature for fast freezing a consumer product located in the fast freeze bin,
wherein the controller is configured to selectively deactivate at least one of the fast cool feature, the beverage cool feature and the fast freeze feature in the energy savings mode.

4. The refrigerator of claim 3, wherein the controller is further configured to deactivate each of the fast cool feature, the beverage cool feature and the fast freeze feature in the energy savings mode.

5. The refrigerator of claim 1, wherein the one or more power consuming devices further includes an ice and water dispenser, and an icemaker, wherein the controller is further configured to selectively deactivate one of the dispenser and the icemaker in the energy savings mode.

6. The refrigerator of claim 1, wherein the one or more power consuming devices further includes a first light source for illuminating the fresh food compartment and a second light source for illuminating the freezer compartment, wherein the controller is further configured to one of deactivate and dim one of the first light source and the second light source in the energy savings mode.

7. The refrigerator of claim 1, wherein the one or more power consuming devices further includes at least one electrically driven anti-sweat heater for preventing exterior condensation, wherein the controller is further configured to one of deactivate, reduce voltage to and duty cycle the at least one anti-sweat heater in the energy savings mode.

8. The refrigerator of claim 1, wherein the one or more power consuming devices includes an automatic defrost cycle having a scheduled activation time, wherein if the scheduled activation time occurs while operating in the energy savings mode the controller is further configured to delay the defrost cycle until the energy savings mode ceases unless performance degradation of the refrigerator is detected.

9. The refrigerator of claim 1, wherein the one or more power consuming devices includes an automatic defrost cycle having a scheduled activation time, wherein while operating in the normal operating mode the controller is further configured to initiate the defrost cycle prior to the scheduled activation time if the controller determines that the scheduled activation time will occur in the energy savings mode.

10. The refrigerator of claim 1, wherein the signal is further indicative of a price tier of the supplied energy, the price tier being one of low, medium, high and critical, wherein the controller is configured to operate the refrigerator in an operating mode corresponding to the price tier.

11. The refrigerator of claim 1, further including a user interface operatively connected to the controller, the user interface including a selectable override option providing a user the ability to select which of the one or more power consuming devices are delayed, adjusted and/or disabled by the controller in the energy savings mode, the user interface further including a display communicating activation of the energy savings mode.

12. The refrigerator of claim 11, wherein the energy savings mode display includes a display selected from the group consisting of "ECO", "Eco", "EP", "ER", "CP", "CPP", "DR", and "PP".

13. The refrigerator of claim 1, wherein the signal is further indicative of the cost of the energy provided when in the current state, the refrigerator further including a display indicative of current cost of energy and current cost of operating the refrigerator.

14. A refrigerator control method, comprising:
determining a utility state for an associated energy supplying utility, the utility state being indicative of at least a peak demand period or an off-peak demand period;
operating a refrigerator in a normal mode during the off-peak demand period;
operating the refrigerator in an energy savings mode during the peak demand period;
selectively scheduling, delaying, adjusting and/or deactivating any number of one or More power consuming devices of the refrigerator to reduce power consumption of the refrigerator in the energy sayings mode, including increasing a setpoint temperature of a freezer compartment to precipitate less compressor on time in the energy savings mode; and
returning to the normal mode after the peak demand period is over.

15. The method of claim 14, wherein the one or more power consuming devices includes a fresh food compartment having a setpoint temperature of the fresh food compartment, the method further comprising increasing the setpoint temperature of the fresh food compartment to precipitate less compressor on time in the energy savings mode.

16. The method of claim 14, wherein the one or more power consuming devices further includes at least one of a fast cool feature, a beverage cool feature, a fast freeze feature, and an icemaker, the method further comprising deactivating at least one of the fast cool feature, the beverage cool feature, the fast freeze feature and the icemaker in the energy savings mode.

17. The method of claim 14, wherein the one or more power consuming devices further includes an anti-sweat heater for preventing exterior condensation, the method further comprising one of deactivating, throttling or duty cycling the anti-sweat heater in the energy savings mode.

18. The method of claim 14, further comprising:
determining a scheduled on-time of a defrost cycle;
determining if the scheduled on-time will occur while operating in the energy savings mode; and
delaying the scheduled on-time of the defrost cycle while operating in the energy savings mode unless performance degradation of the refrigerator is detected.

19. The method of claim 14, further comprising:
determining a scheduled on-time of a defrost cycle;
determining if the scheduled on-time will occur while operating in the energy savings mode; and
activating the defrost cycle prior to the scheduled on-time while still operating in the normal mode if close to the scheduled on-time.

20. The method of claim 14, further comprising:
determining the energy cost associated with the utility state;
displaying current cost of operating; the refrigerator,
displaying current cost of supplied energy, and
alerting a user of a peak demand period.

21. A refrigerator comprising:
a fresh food compartment having a targeted setpoint temperature;
a freezer compartment having, a targeted setpoint temperature;
a refrigeration system for cooling each of the fresh food compartment and the freezer compartment to its targeted setpoint temperature;
an automatic defrost cycle having a scheduled on-time; and
a controller configured to receive and process an energy signal, the energy signal having a first state indicative of a utility peak demand period and a second state indicative of a utility off-peak demand period, the controller operating the refrigerator in one of an energy savings mode and a normal operating mode based on the received energy signal being in the first state and the second state respectively,
wherein the controller is further configured to increase the targeted setpoint temperature of at least one of fresh food compartment and the freezer compartment in the energy savings mode, and
wherein the controller is further configured to delay activation of the automatic defrost cycle if the scheduled on-time occurs in the energy savings mode unless performance degradation of the refrigerator is detected.

22. The refrigerator of claim 21, wherein the controller is further configured to initiate the automatic defrost cycle prior to the scheduled on-time if the controller determines that the scheduled on-time will occur while operating in the energy savings mode.

23. The refrigerator of claim 21,
wherein the energy signal has an associated energy cost and the controller is further configured to override the operating mode of the refrigerator based on a user selected targeted energy cost,
wherein if current energy cost exceeds the user selected targeted energy cost, the controller operates the refrigerator in the energy savings mode, and
wherein if the current energy cost is less than the user selected targeted energy cost, the controller operates the refrigerator in the normal operating mode.

24. The refrigerator of claim 21, wherein the refrigeration system includes a compressor, a condenser and an evaporator in a refrigerant flow relationship, the controller being further configured to one of adjust a duty cycle of and adjust a refrigeration capacity of the compressor in the energy savings mode.

25. The refrigerator of claim 24, further including at least one sensing device operatively connected to the controller for measuring temperature of each of the fresh food compartment and the freezer compartment, wherein in the energy savings mode if the measured temperature of one of the fresh food compartment and the freezer compartment exceeds its increased targeted setpoint temperature, the controller is further configured to one of adjust the duty cycle of the compressor to precipitate more compressor on time, increase the speed of the compressor and increase the capacity of the compressor until the measured temperature no longer exceeds the increased targeted setpoint temperature.

26. The refrigerator of claim 21, wherein the controller is further configured to reduce before the utility peak demand period the targeted setpoint temperature of the freezer compartment to pre-chill the freezer compartment to a temperature lower than the targeted setpoint temperature and increase the targeted setpoint temperature of the freezer compartment during the utility peak demand period.

27. The refrigerator of claim 21, wherein the controller is further configured to reduce, before the utility peak demand period the targeted setpoint temperature of the fresh food compartment to pre-chill the fresh food compartment to a temperature lower than the targeted setpoint temperature and increase the targeted setpoint temperature of the fresh food compartment during the utility peak demand period.

* * * * *

UNITED STATES PATENT AND TRADEMARK OFFICE
CERTIFICATE OF CORRECTION

| | | |
|---|---|---|
| PATENT NO. | : 8,474,279 B2 | Page 1 of 1 |
| APPLICATION NO. | : 12/559561 | |
| DATED | : July 2, 2013 | |
| INVENTOR(S) | : Besore et al. | |

It is certified that error appears in the above-identified patent and that said Letters Patent is hereby corrected as shown below:

In the Claims:

In Column 15, Line 47, in Claim 1, delete "saving mode," and insert -- savings mode, --, therefor.

In Column 16, Line 6, in Claim 3, delete "having," and insert -- having --, therefor.

In Column 17, Line 20, in Claim 14, delete "More" and insert -- more --, therefor.

In Column 17, Line 22, in Claim 14, delete "sayings" and insert -- savings --, therefor.

In Column 17, Line 62, in Claim 20, delete "operating;" and insert -- operating --, therefor.

In Column 18, Line 1, in Claim 21, delete "having," and insert -- having --, therefor.

In Column 18, Line 65, in Claim 27, delete "reduce," and insert -- reduce --, therefor.

Signed and Sealed this
Fifteenth Day of October, 2013

Teresa Stanek Rea
*Deputy Director of the United States Patent and Trademark Office*